US005465372A

United States Patent [19]
Gottlieb et al.

[11] Patent Number: 5,465,372
[45] Date of Patent: Nov. 7, 1995

[54] DATAFLOW COMPUTER FOR FOLLOWING DATA DEPENDENT PATH PROCESSES

[75] Inventors: Israel Gottlieb, Jerusalem; Yehuda Singer, Tel Aviv, both of Israel

[73] Assignee: Bar Ilan University, Ramat Gan, Israel

[21] Appl. No.: 994

[22] Filed: Jan. 6, 1993

[30] Foreign Application Priority Data

Jan. 6, 1992 [IL] Israel ......................................... 100,598

[51] Int. Cl.$^6$ ............................. G06F 9/30; G06F 9/345; G06F 9/445; G06F 11/28
[52] U.S. Cl. .................. 395/800; 364/229.5; 364/239.4; 364/239.9; 364/243.42; 364/259.9; 364/259.6; 364/262.4; 364/262.9; 364/263.1; 364/DIG. 1; 364/DIG. 2; 364/266.4
[58] Field of Search ................................... 395/800, 375, 395/500, 400, 425, 775, 575, 650, 250, 600; 364/DIG. 1, DIG. 2

[56] References Cited

U.S. PATENT DOCUMENTS

| | | | |
|---|---|---|---|
| 4,953,082 | 8/1990 | Nomura | 395/650 |
| 4,964,042 | 10/1990 | Sterling et al. | 395/200 |
| 4,972,375 | 11/1990 | Yamasaki et al. | 395/400 |
| 5,241,635 | 8/1993 | Papadopoules et al. | 395/375 |

OTHER PUBLICATIONS

David E. Culler, "Dataflow Architecture" (1986), Annual Reviews in Computer Science.
Bic L., "A Process Oriented Model For Efficient Execution of Dataflow Programs", Proceedings of the 7th International Confrence on Distributed Computing, Berlin (1987).
R. A. Iannucci, "A Dataflow/Von–Neumann Hybrid", LCS TR–418 MIT, Cambridge, Mass., May 1988.
I. Gottlieb, "Dynamic Structured Data Flow: Preserving the Advantages of Sequential Processing in a Data Driven Environment", Inter. Con. on Parallel Processing, Chicago, 1988.

*Primary Examiner*—Alyssa H. Bowler
*Assistant Examiner*—Daniel Pan

[57] ABSTRACT

A dataflow machine for generally following data dependent path processes, the machine including an instruction store, an operand store, a plurality of data dependent path process executors, each process executor including an instruction queue and a queue loader associated with the instruction queue and operative to load the instruction queue with instructions selected from the instruction store, wherein the instructions with which the instruction queue is loaded are associated with a dynamically determined data dependent path process and are selected based, at least in part, on an active operand associated with each instruction, the active operand including a result of a previous instruction, and wherein at least some of the instructions are selected based, at least in part, on availability of an outside operand, and wherein the queue loader is operative to read the outside operand from the operand store, execution apparatus operative to sequentially apply each instruction in each instruction queue to at least the active operand associated with each instruction and to produce a result from each instruction, and storing apparatus operative to store the result in the operand store.

12 Claims, 12 Drawing Sheets

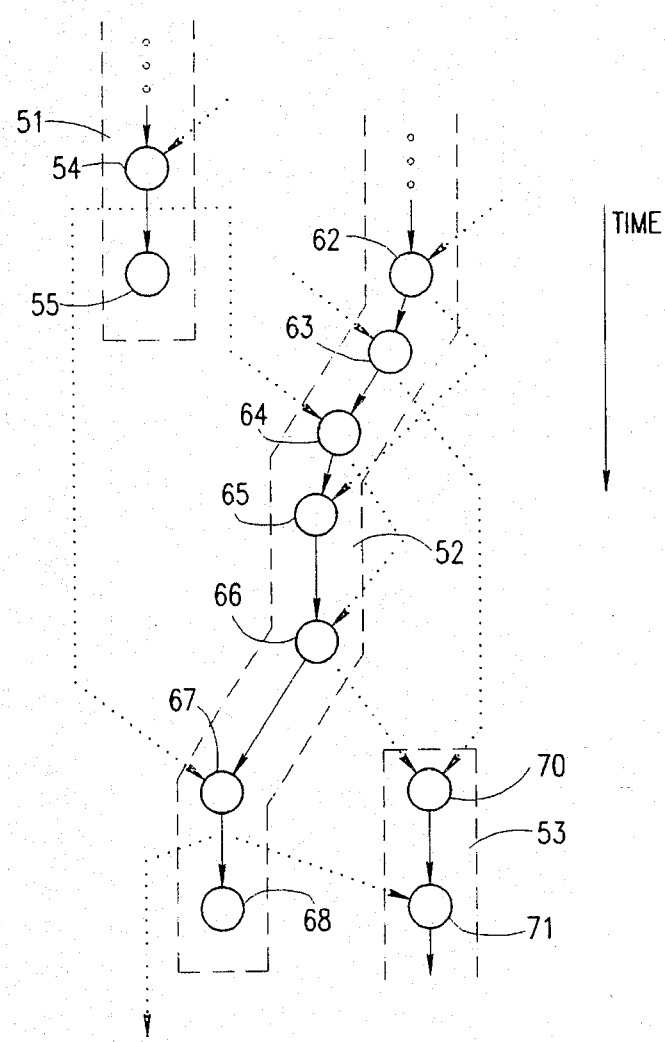
FIG.2
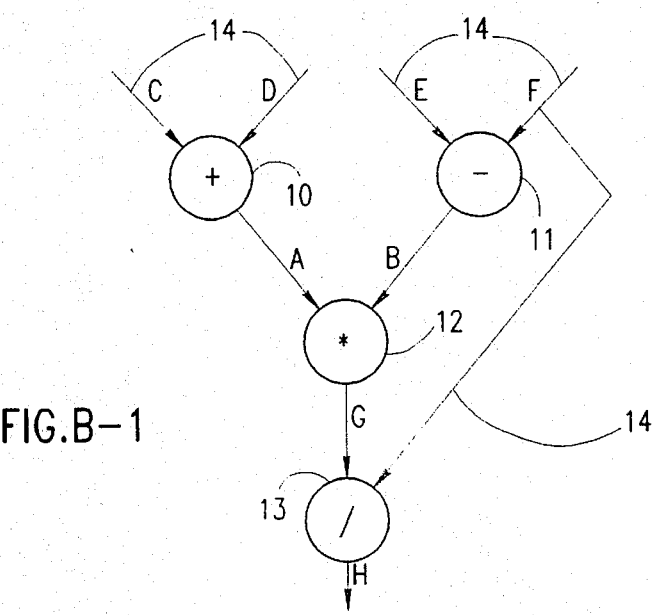
FIG.B-1

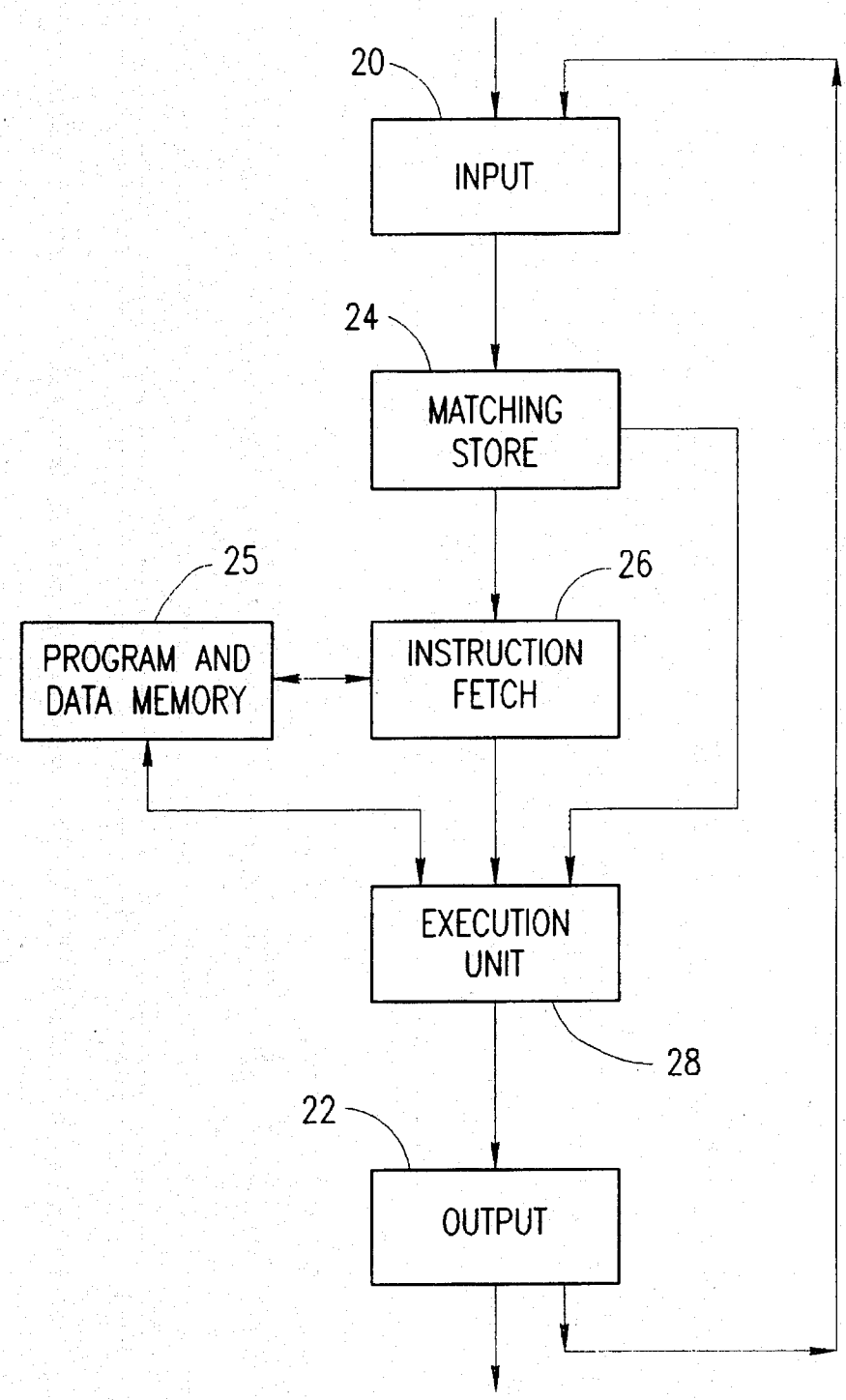
FIG.B-2

| ADRS | OP CODE | SUCCESSORS | SECOND PREDECESORS | STATE (A) BITSTRINGS | STATE (A) RESULTS | STATE (B) BITSTRINGS | STATE (B) RESULTS | STATE (C) BITSTRINGS | STATE (C) RESULTS | STATE (D) BITSTRINGS | STATE (D) RESULTS |
|---|---|---|---|---|---|---|---|---|---|---|---|
| 0 | BEG | | | | Y | | Y | | Y | | Y |
| 1 | SEL | | | | X | | X | | X | | X |
| 2 | + | 5 3 4 | 3 1 0 | 200 → 0 1 1 | | 0 1 1 | P | 0 1 1 | P | 0 1 1 | P |
| 3 | * | 5 6 – | 2 4 – | 0 0 0 | 204 | 1 0 0 | 206 | 1 1 0 | Q | 1 1 0 | R |
| 4 | / | 6 – – | 3 – – | 0 0 0 | 202 | 0 0 0 | | 0 0 0 | Q | | Q |
| 5 | * | 7 – – | 6 – – | 0 0 0 | | 0 0 0 | | 0 0 0 | | | |
| 6 | – | 7 8 – | 5 – – | 0 0 0 | | 0 0 0 | | 0 0 0 | | 0 0 0 | |
| 7 | / | | | | | | | | | | |
| 8 | – | | | | | | | | | | |

INSTRUCTION INFORMATION

FIG.4

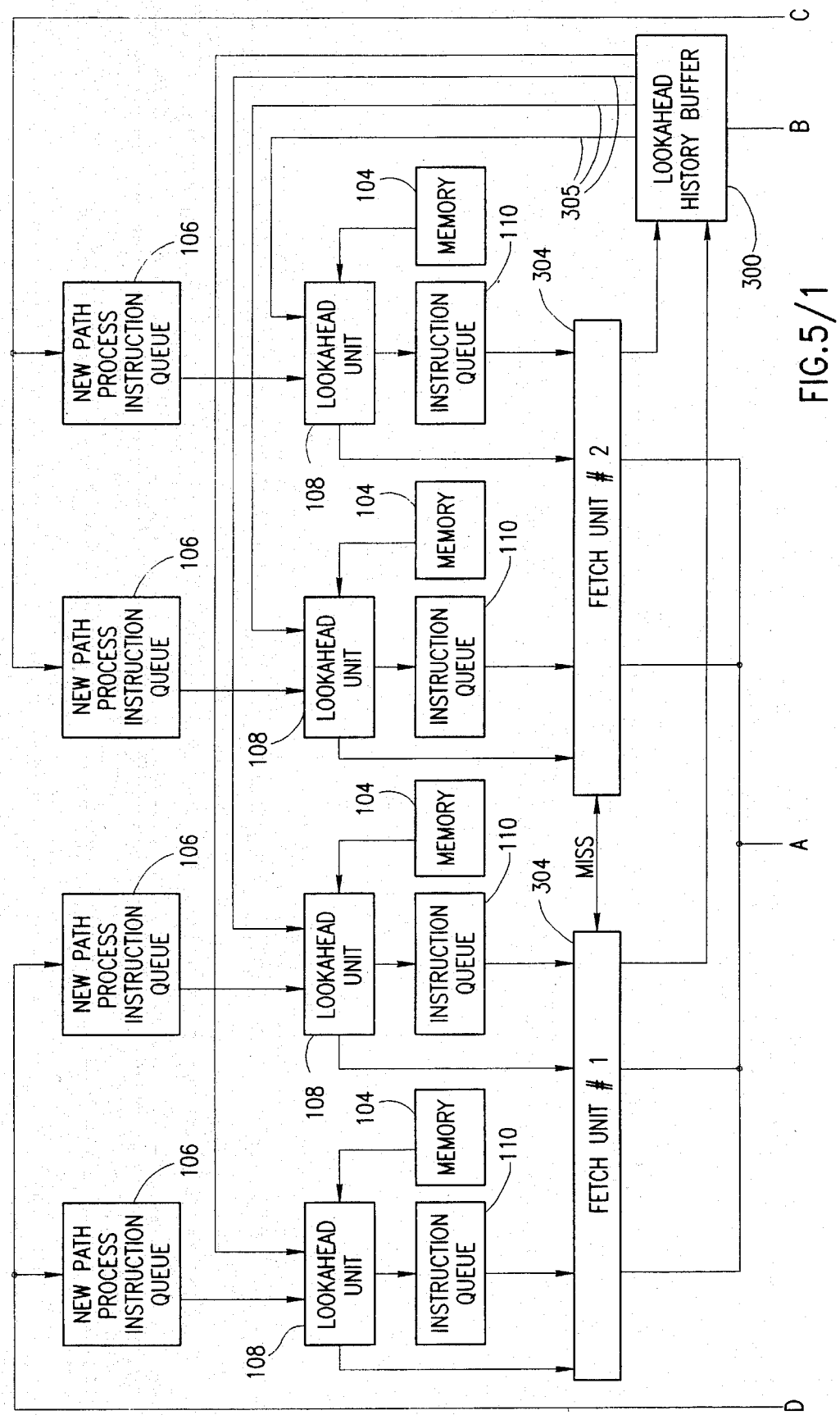
FIG.5/1

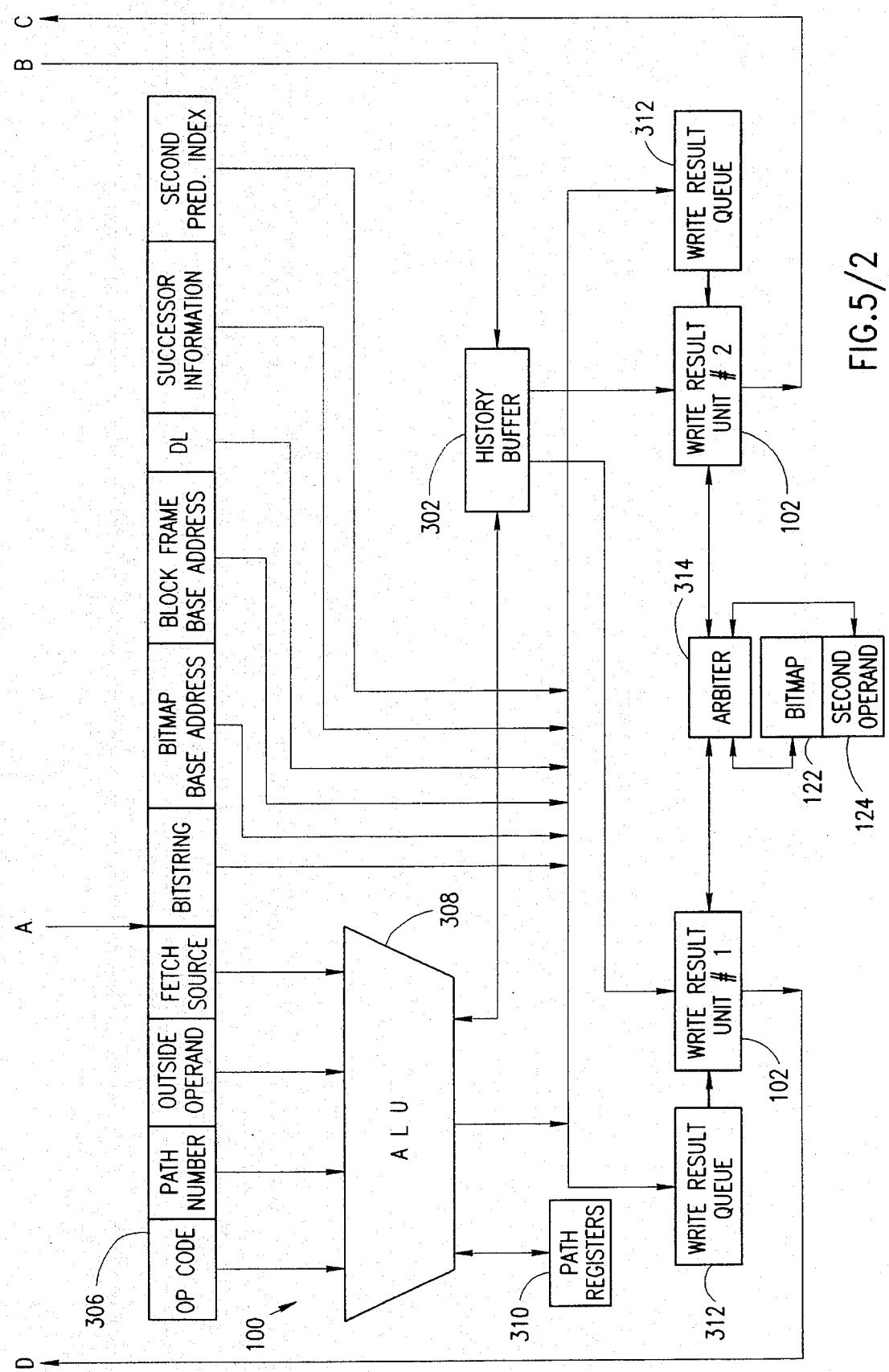
FIG.5/2

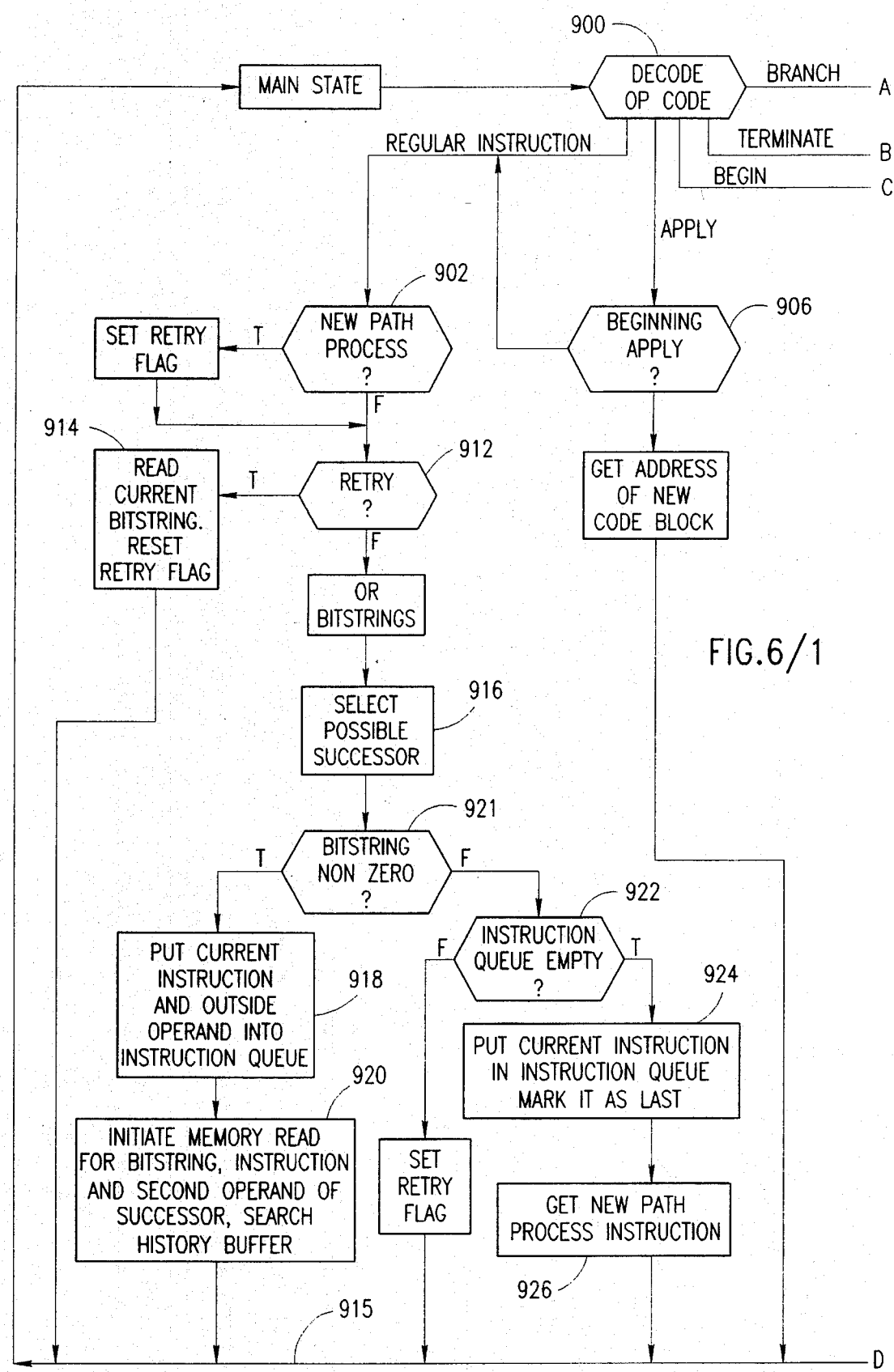
FIG.6/1

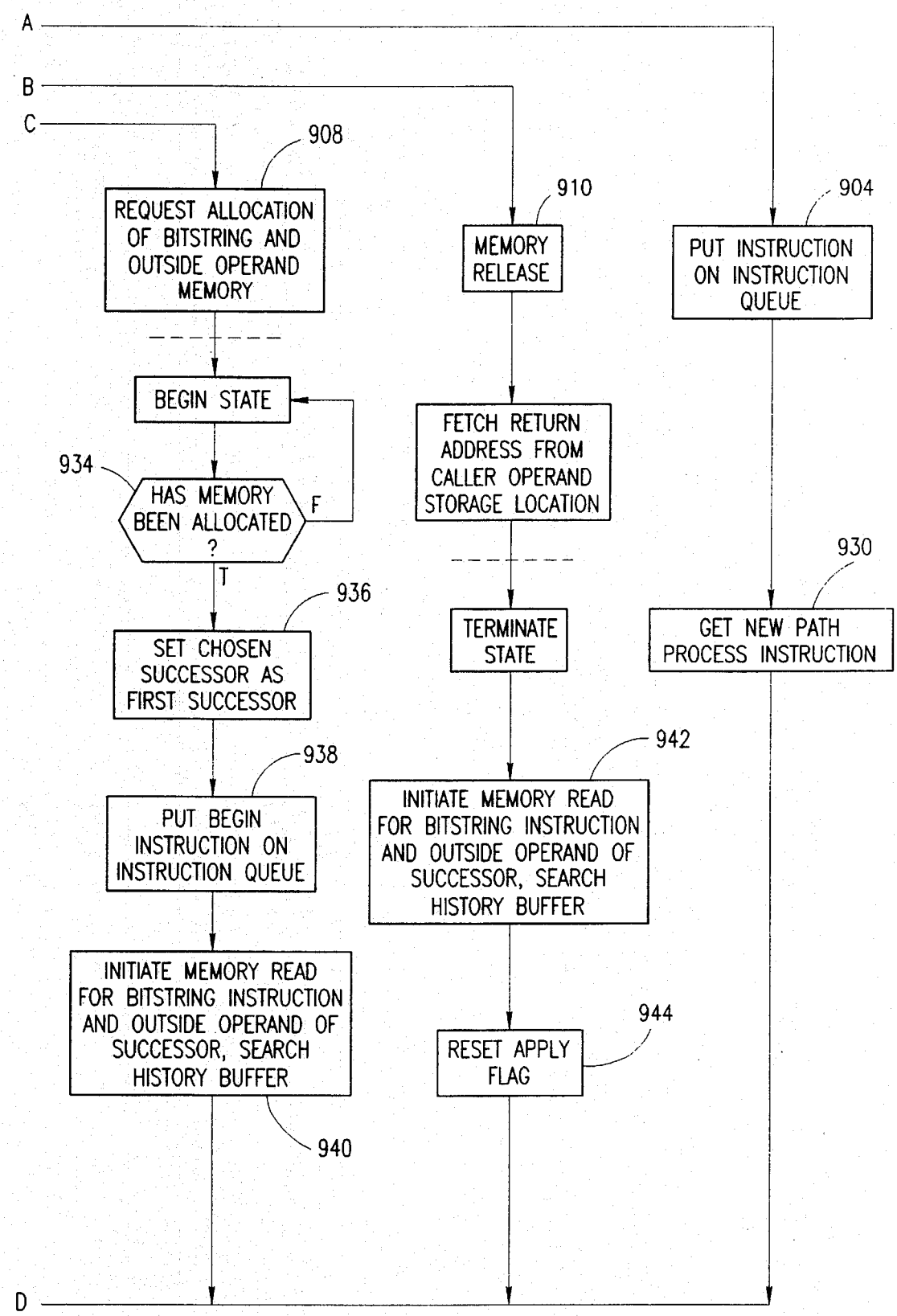
FIG.6/2

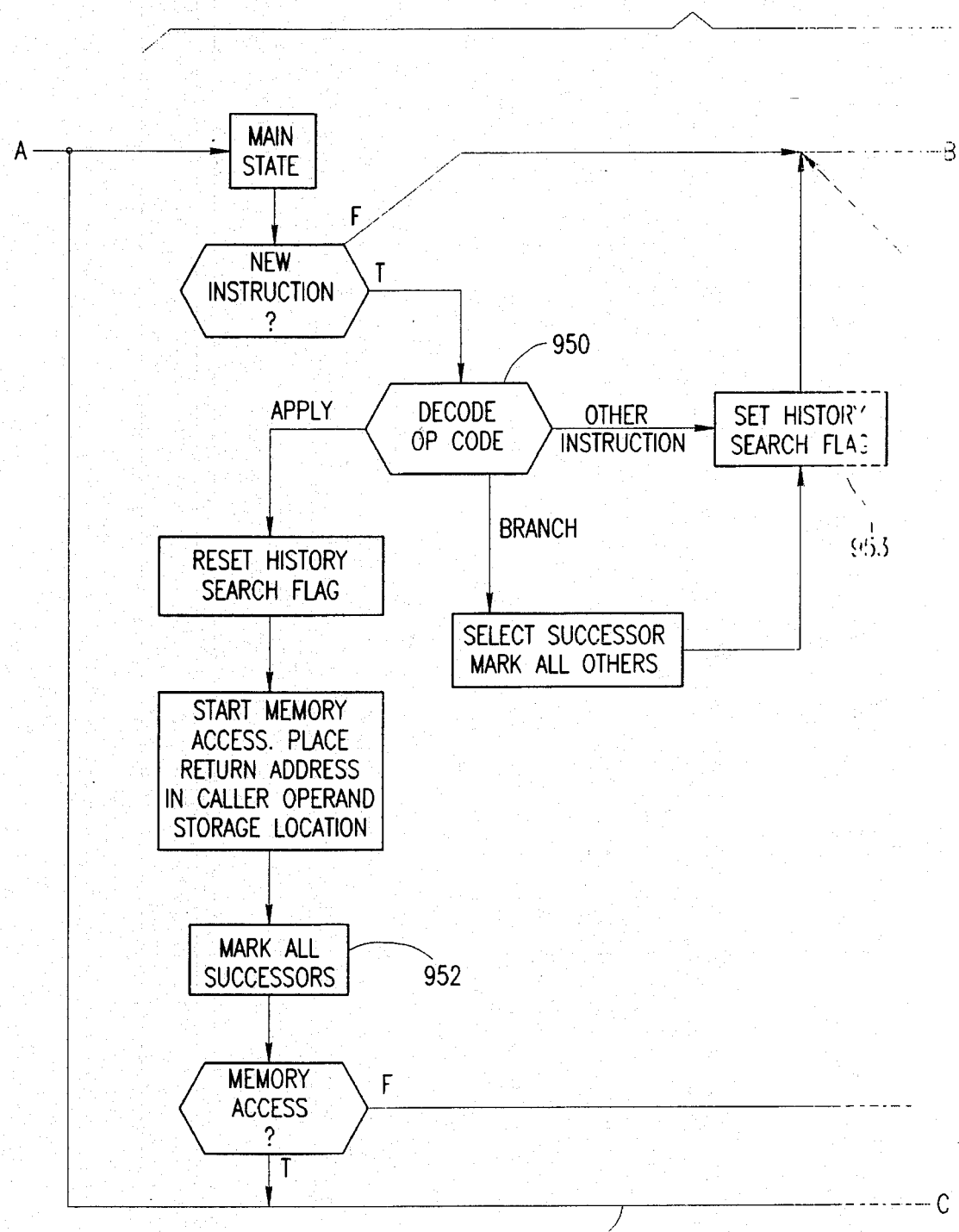
FIG.7/1

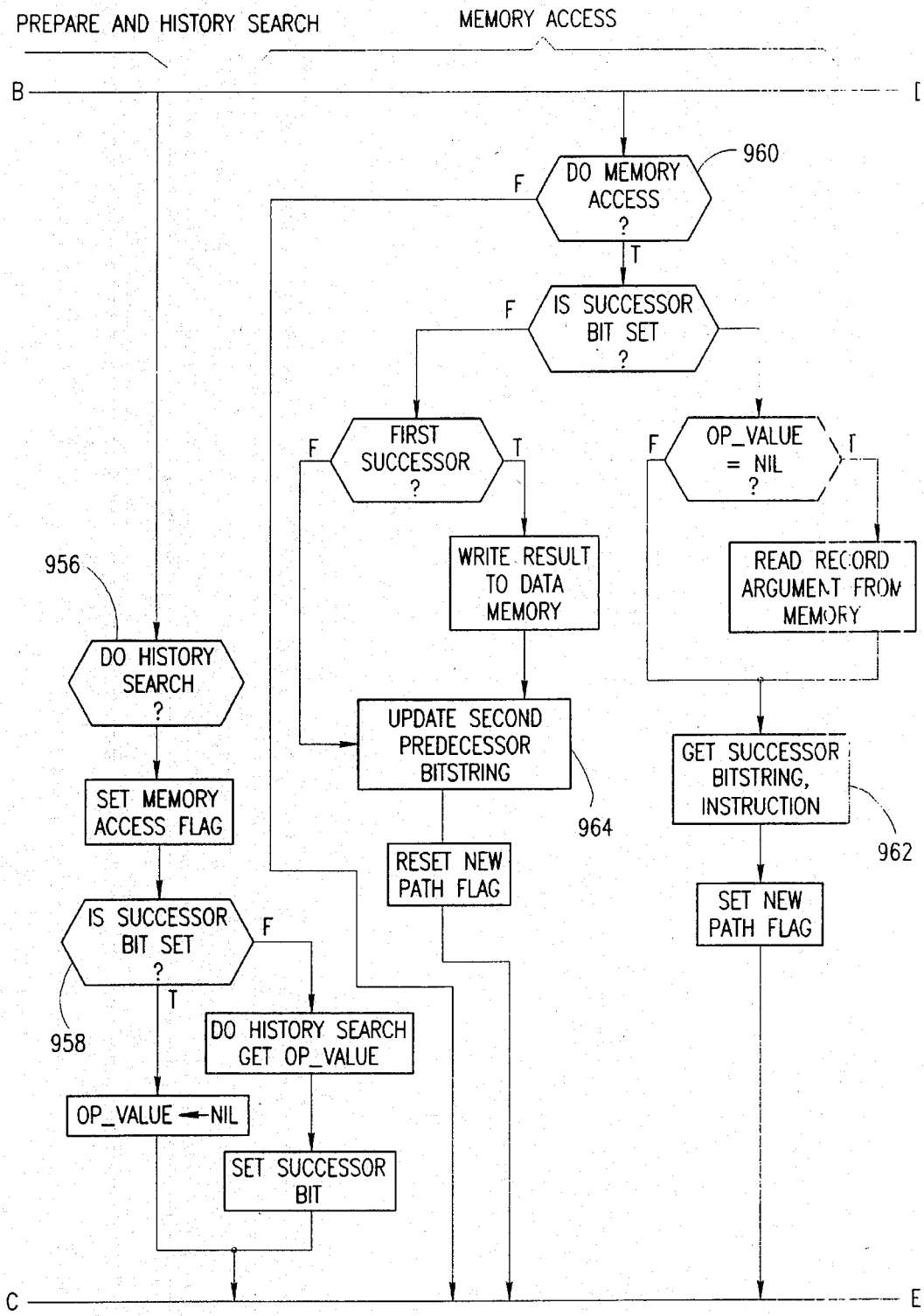
FIG.7/2

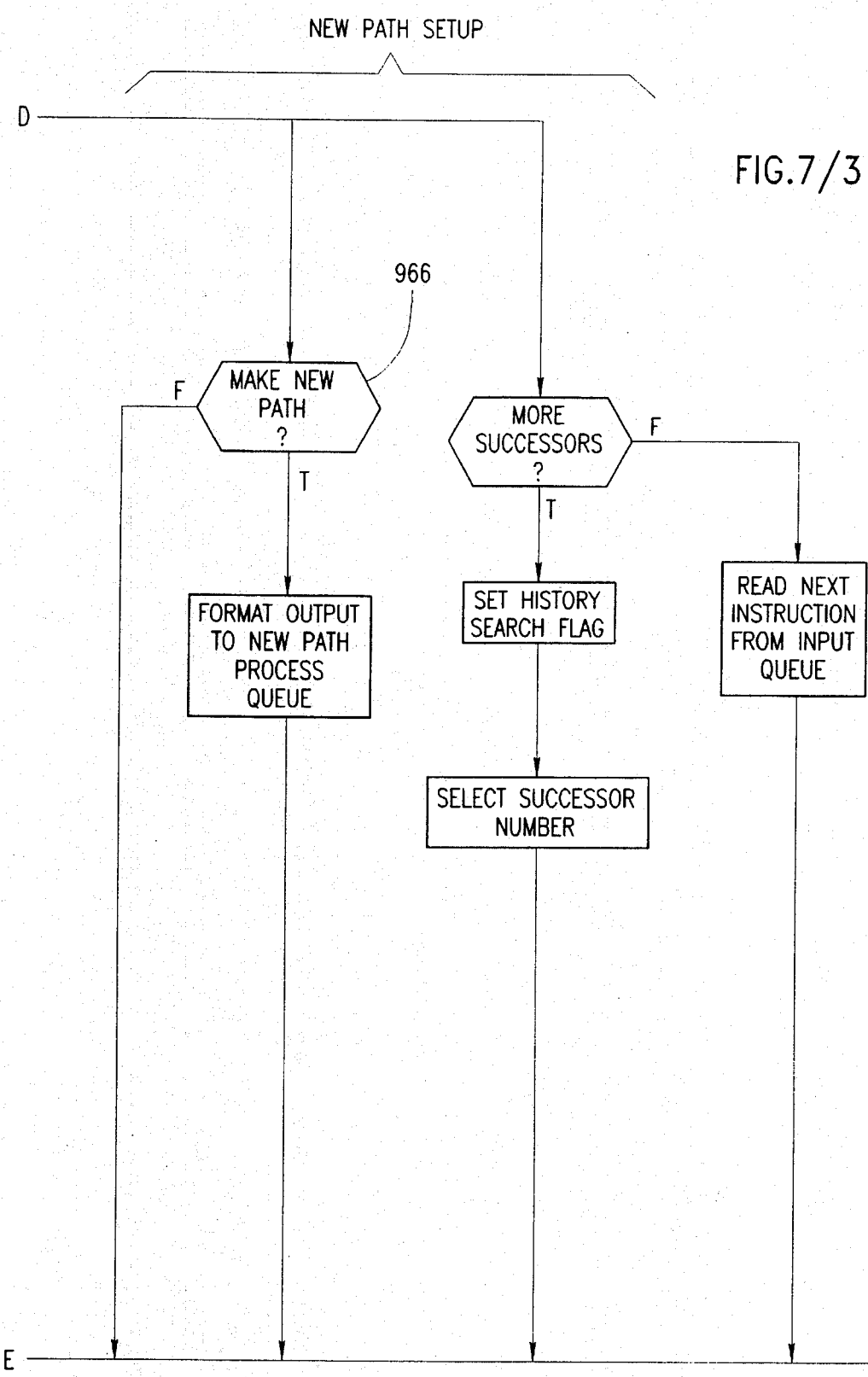
FIG.7/3

DATAFLOW COMPUTER FOR FOLLOWING DATA DEPENDENT PATH PROCESSES

FIELD OF THE INVENTION

The present invention relates generally to computers with a dataflow architecture.

BACKGROUND OF THE INVENTION

Computers with dataflow architectures, known-as "dataflow machines", are known in the art. They are described in an overview article by David E. Culler and Arvind, "Dataflow Architecture," *Annual Reviews in Computer Science*, 1986. The article is incorporated herein by reference.

Briefly, the dataflow model of computation describes a program by a directed graph, shown in FIG. B-1 to which reference is now made, where nodes 10–13 denote instructions of any type, and arcs 14 denote data dependencies. The term "instruction" refers to the operation performed at a node.

The function graphed by the dataflow graph of FIG. B-1 is:

$$H=[(C+D)*(E-F)]/F \tag{1}$$

In the dataflow model, the data values A–H are carried as "tokens" along the arcs 14 and a node 10–13 can execute whenever its input data, or operands, are available. Thus, in the example shown in FIG. B-1, nodes 10 and 11 can execute independently of the other nodes and of each other, node 12 must wait until both of nodes 10 and 11 have executed, and node 13 must wait until node 12 has executed.

In the ideal dataflow model, each arc 14 is an unlimited first-in-first-out (FIFO) buffer and each node operates on its operands in a FIFO manner. This, however, is not a practical model. Typically, one or the other or both of the requirements of FIFO operation have to be relaxed.

For example, the requirement of FIFO operation at the nodes might be relaxed. If so, then the operands must be "tagged" in some way. The operands which are provided to an instruction which executes more than once, such as an instruction within a loop or within a subroutine, must belong to the same iteration number and/or the same invocation of the subroutine.

Therefore, in some, "dynamic" dataflow architectures, the operands are tagged to indicate to which performance, or "instantiation", of the instruction they belong. The given instruction, being the one about to execute, then has to search among the tokens on its arcs 14 to find two operands with similar tags to serve as its input for the current instantiation.

It will be noted that the model described herein of the dataflow machine assumes that at most two operands are needed for each instruction.

An example architecture for a dynamic tagged dataflow machine is shown in FIG. B-2. It has an input unit 20, for forwarding, one at a time, operands received either from the outside or from an output unit 22 to a matching store unit 24.

When a tagged operand enters the matching store 24, its tag is compared to the tags of all the other operands stored therein. If the tag of the entering operand matches a tag of one of the stored operands, then the entering operand and the operand which is matched to it are forwarded to an instruction fetch unit 26 and the matched operand is purged from the matching store 24.

Otherwise, the entering operand is stored in the matching store 24 to await its matching operand.

The instruction fetch unit 26 receives the pair of operands and from the information stored in their tags, fetches the instruction to which they belong from a program and data memory 25. The unit 26 then queues the instruction and its operands for eventual execution by an execution unit 28.

The execution unit 28 executes the instruction and produces a result. The result is combined with an appropriate tag and provided to the output unit 22, for returning the result to the input unit 20 as a newly available operand.

It will be noted that the machine of FIG. B-2 is operative for scalar operations only.

Other forms of dataflow architectures are discussed in the paper by Culler and Arvind, described hereinabove.

The dataflow architecture described hereinabove in FIG. B-2 provides instructions to the execution unit 28 whenever the two operands are available for an instruction. Successive executed instructions typically are not related to each other and thus, the output of a first instruction is, in general, not used as an input to a second succeeding instruction.

If we define a critical path through a program as being the longest set of consecutive instructions which cannot be avoided and if we define a data dependence path as a path in which the next instruction depends on the output of the previous instruction, then the executed instructions of prior art dataflow machines do not follow data dependence paths and therefore, do not follow the critical path.

Furthermore, prior art dataflow machines require mechanisms to tag and store every result produced by the execution unit 28. The overhead of this mechanism applied over the entirety of results of a program results in a very slow memory access cycle.

There also exist dataflow/Von-Neumann hybrid machines. These are designed to overcome the long pipeline which is characteristic of pure dataflow machines. Specifically, they try to improve the matching store unit 24 and the "compute address of next instruction" operation performed by the execution unit 28. The following articles describe some of the proposed solutions:

Bic L., "A Process Oriented Model for Efficient Execution of Dataflow Programs", *Proceedings of the 7th International Conference on Distributed Computing*, Berlin, W. Germany, September 1987; and Iannucci R., *A dataflow/von-Neumann Hybrid*, LCS TR-418, MIT, Cambridge, Mass., May 1988.

The dataflow/Von-Neumann hybrids described in the above-mentioned articles use compilers which pre-package the machine code of the program into sequences which can only execute in order. The hybrids benefit from this restriction by not having to compute at run-time the address of the next instruction in the sequence, since the compiler has already fixed the only way to go. The apriori assumption about the exact sequence of execution also avoids the need to check for availability of operands in some cases because the compiler fixes their time of execution and their location in memory.

However, it is, in general, difficult to know at compile time how a program will develop dynamically and therefore, the dataflow/Von-Neumann hybrids cannot fully exploit the parallelism available in the program being run.

An article by I. Gottlieb, one of the present Applicants, "Dynamic Structured Data Flow: Preserving the Advantages of Sequential Processing in a Data Driven Environment", *International Conference on parallel Processing*, Chicago, 1988, is a theoretical discussion of an architectural model for automatic sequencing of parallel operations characteristic of dataflow.

SUMMARY OF THE INVENTION

It is therefore an object of the present invention to provide a dataflow architecture which performs data dependent path processes thereby to execute the critical path in the shortest time possible.

It is a further object of the present invention to provide a dataflow architecture which locally preserves the results of instructions of one active path process for use by other active path processes.

There is therefore provided, in accordance with an embodiment of the present invention, a dataflow machine for generally following data dependent path processes. The machine includes apparatus for filling an instruction queue with instructions and at least one corresponding outside operand, wherein the instructions follow a plurality of data dependent path processes, apparatus for indicating to which of the data dependent path processes the instruction belongs, execution apparatus for sequentially applying each instruction in the instruction queue to the at least one outside operand and to an active operand corresponding to the data dependent path process to which the instruction belongs and for producing a result from each instruction and apparatus for storing the result as the active operand for use by the execution apparatus with the next instruction of the data dependent path process.

Additionally, in accordance with an embodiment of the present invention, corresponding to each instruction is a bitstring indicating whether or not any successor instructions of the instruction are enabled and wherein the apparatus for filling include apparatus for reading the bitstring and for selecting a next instruction on the data dependent path process in accordance with the bitstring.

Furthermore, in accordance with an embodiment of the present invention, the apparatus for filling includes apparatus for selecting a new data dependent path process from a new path process queue when an old data dependent path process no longer has any enabled successor instructions.

Still further, in accordance with an embodiment of the present invention, the machine includes apparatus for writing the result to memory for use with instructions on other data dependent path processes as one of the at least one outside operand.

Moreover, in accordance with an embodiment of the present invention, the machine includes apparatus for placing at least one not selected successor instruction in the new path process queue when the bitstring indicates that more than one successor instruction is enabled.

Additionally, in accordance with an embodiment of the present invention, the machine includes apparatus for temporarily capturing information associated with a small set of instructions queued for execution by the execution apparatus and queued to be written by the apparatus for storing.

Further, in accordance with an embodiment of the present invention, the apparatus for temporarily capturing include a lookahead history buffer for temporarily storing addresses and lookahead bitstrings corresponding to instructions whose outside operands will become shortly become available and a write result history buffer for temporarily storing addresses and results corresponding to instructions which have recently been executed by the execution apparatus.

Still further, in accordance with an embodiment of the present invention, the apparatus for filling accesses the lookahead history buffer to receive the lookahead bitstring.

Moreover, in accordance with an embodiment of the present invention, corresponding to each instruction is a stored bitstring indicating whether or not any successor instructions of the instruction are enabled and wherein the apparatus for filling include apparatus for reading the stored bitstring, for ORing the lookahead bitstring with the stored bitstring to produce an updated bitstring and for selecting a next instruction on the data dependent path process in accordance with the updated bitstring.

Finally, in accordance with an embodiment of the present invention, corresponding to each instruction is a stored bitstring indicating whether or not any successor instructions of the instruction are enabled and wherein the apparatus for storing accesses the write result history buffer to determine if an outside operand for a successor instruction is available only if the bitstring indicates that the successor instruction is not enabled.

BRIEF DESCRIPTION OF THE DRAWINGS AND ANNEXES

The present invention will be understood and appreciated more fully from the following detailed description taken in conjunction with/he drawings and annexes in which:

FIG. B-1 is an illustration of a dataflow graph, useful in understanding prior art dataflow machines;

FIG. B-2 is a block diagram illustration of a prior art dataflow machine;

FIG. 2 is an illustration of three execution path processes through time, useful in understanding the operation of the machine of FIG. 1;

FIG. 4 is an illustration of instruction information used in the fourscores of FIGS. 3A–3D;

Figure 1:
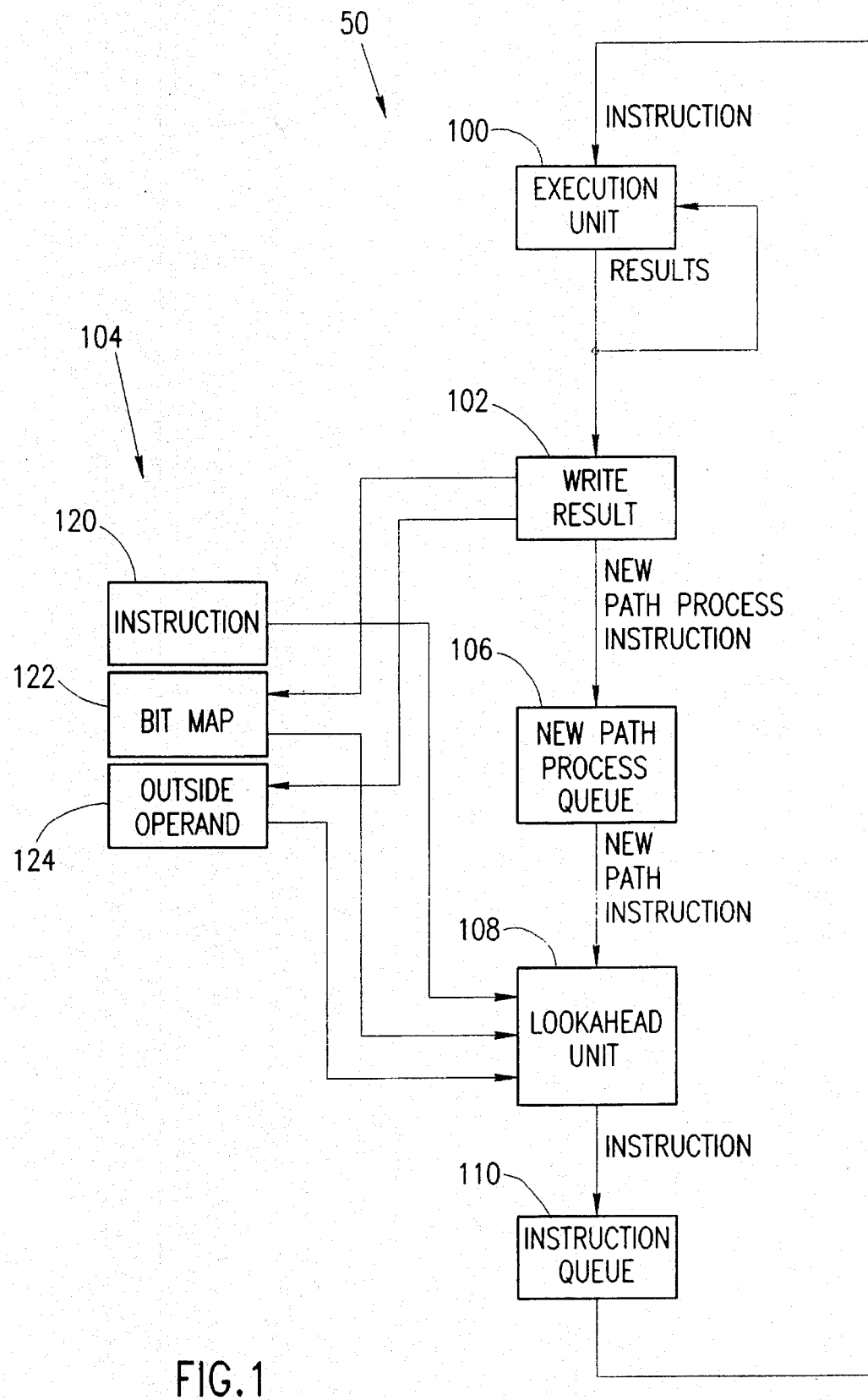
FIG. 1 is a simplified block diagram illustration of a dynamically partitioned dataflow machine, constructed and operative in accordance with the present invention.

FIGS. 5/1, 5/2 are detailed block diagram illustrations of the architecture of the dataflow machine of FIG. 1;

FIGS. 6/1, 6/2 are state diagram illustrations of a lookahead unit useful in the architecture shown FIGS. 5/1–5/2;

FIGS. 7/1–7/3 are state diagram illustration of a write unit useful in the architecture shown in FIGS. 5/1–5/2;

Annex A is a pseudocode description of the state diagram, shown in FIGS. 6/1–6/2, of the lookahead unit;

Annex B is a pseudocode description of the state diagram, shown in FIGS. 7/1–7/3, of the write unit;

Annex C is a pseudocode description of a history buffer, useful in the architecture of FIGS. 5/1–5/2; and Annex D is a specification of an instruction set useful with the dataflow machine of FIG. 5/1–5/2.

DETAILED DESCRIPTION OF PRESENT INVENTION

Reference is now made to FIGS. 1 and 2 which respectively illustrate a simplified block diagram of a dynamically partitioned dataflow machine 50, constructed and operative in accordance with the present invention, and its operation.

The dataflow machine 50 (FIG. 1) executes data dependent path processes in order to dynamically follow data dependent paths as a program (not shown) executes. Three data dependent path processes, labeled 51–53, are shown in FIG. 2, each of which is a collection of nodes, respectively labeled 54–55, 62– 68 and 70–71.

It will be appreciated that the direction of the path processes 51–53 is dependent on the results of each node and is determined only after the instruction at each node executes. Nothing in the program specifies the direction the path processes 51–53 will take upon execution.

Each node in a path process receives two operands, an "active operand" which is part of the active state of the path process 51, 52 or 53 and an "outside operand" which is received from outside the path process. The operand within the active state is transformed with each instruction executed at each node. In FIG. 2, the active operands are shown with solid lines and the outside operands are shown with dotted lines.

When a path process reaches a node where operands are not available, such as nodes 55 and 68, the machine 50 terminates the relevant path process 51 or 52, respectively. Thus, when the machine 50 arrives at node 55, it terminates the path process 51. Subsequently, the machine 50, executing path process 52, arrives at the same node, now labeled 64. As before, the output of node 54 is available; however, for node 64, the output of node 63, the other operand, is now available and therefore, node 64 is executable.

The machine 50 continues executing path process 52 from node 64 to node 66 at which it finds that both data-dependent successor nodes, nodes 67 and 70, are executable. The machine 50 arbitrarily chooses to continue with node 67 and causes a new path process, path process 53, to be initiated, starting at node 70.

It will be noted that path process 53 cannot be initiated until node 66 has executed because, until then, the operands for node 70 are not available.

It will be appreciated that operands received from outside a given path process can be either data provided from outside the active path processes or, as is more common, they can be the results of nodes of other path processes or earlier nodes of the present path process. For example, the result of node 62 is used later as an operand to node 65 of the same path process, and the result of node 63 of path process 52 is used as an operand to node 70 of path process 53.

The dataflow machine 50 (FIG. 1) of the present invention typically comprises an execution unit 100 for executing the instruction of a current node and for producing a result to be used as the active operand of a selected successor instruction of the current instruction. It also comprises a write result unit 102 for writing a copy of the result to the appropriate location in a memory 104 for use with unselected successor nodes of the current node.

In order to more easily understand the operation of machine 50, the result is shown as feeding back to the execution unit 100 for use as the active operand of the next instruction. In fact, this is imprecise, as will be detailed hereinbelow.

If the executed node has many successor nodes only one of which is currently executable (i.e. the path process can continue in only one direction), the write result unit 102 writes the result to memory 104 for future use by the currently unexecutable successor nodes.

If the executed node has more than one executable successor node, (e.g. if the executed node is node 66) then the write result unit 102 writes the result and the instruction of the not-chosen successor node or nodes to a new path process queue 106 for later use in initiating a new path process or processes (e.g. path process 53).

The new path process queue 106 is a FIFO buffer which accepts instructions and operands which are the first instructions of path processes. It provides one instruction and one operand to a lookahead unit 108 whenever requested to do so by the lookahead unit 108.

The interconnections of the nodes is called a "code graph" and a section of the graph of a program is called a "code block". Each instruction includes in it information regarding the structure of a portion of the code block immediately succeeding the instruction.

The lookahead unit 108 attempts to pursue a data dependent path through the graph. However, knowing only which instruction follows from a given instruction is insufficient to plan a data dependent path. There needs to be some method of determining which successor nodes are presently executable and which are not.

Therefore, corresponding to each instruction is a successor bitstring containing one bit position for each possible successor instruction. A bit position having a value of 1 is called a "set bit". A set bit indicates that the outside operand of the successor instruction is available and therefore, after executing this instruction, the successor instruction can also be executed.

The lookahead unit 108 utilizes the graph information and the successor bitstring information to determine the executable successor instructions of a current instruction. After selecting one successor instruction, it provides the current instruction and its outside operand to an instruction queue 110, typically comprised of a FIFO buffer, for later execution by the execution unit 100.

The lookahead unit 108 continues performing the above-described operations for a single path process until it reaches a node for which there currently are no executable successor nodes. At that point, the lookahead unit 108 either, as described in more detail hereinbelow, waits for a more current version of the bitstring of the current instruction or requests the next new path process instruction from the new path process queue 106 and begins the above-described operation on the new path process.

Reference is now made to FIGS. 3A–3D and 4 which respectively illustrate four states of a graph of a code block and their corresponding instruction information. Each state occurs after one operation cycle of the machine 50, as is described in more detail hereinbelow.

It will be appreciated that a compiler, operating on a program written by a user of machine 50, breaks the program into code blocks and, based on the shape of the graph, prepares the instruction information for each instruction in the code block.

The graphs of FIGS. 3A–3D comprise 9 interconnected nodes, labeled 0–8, where nodes 0 and 1 have already executed and their results X and Y are already available to successor nodes 3 and 4. Available operands are noted in FIGS. 3A–3D by solid line arrows and unavailable operands are noted by dashed line arrows.

Every successor node has two predecessor nodes. The first predecessor node is the node which provides the active operand and the second predecessor node is the node which provides the outside operand. For example, node 2 is succeeded by nodes 3, 4 and 5 and the second predecessor node of node 4 is node 0. From the point of view of node 0, node 4 is the successor node and node 2 is the second predecessor node.

In FIGS. 3A–3D, the instruction performed by each node is noted within the node. For example, the instruction at node 3 is multiplication and the instruction at node 4 is division. The instructions are listed in FIG. 4 as OP CODES, or operation codes, and they are listed at the number, or address, of each node.

Also listed in FIG. 4 are the successor nodes of each node and the second predecessor nodes of the successor nodes. The successor node and second predecessor node information form part of an instruction packet for each instruction.

Figure 3A:
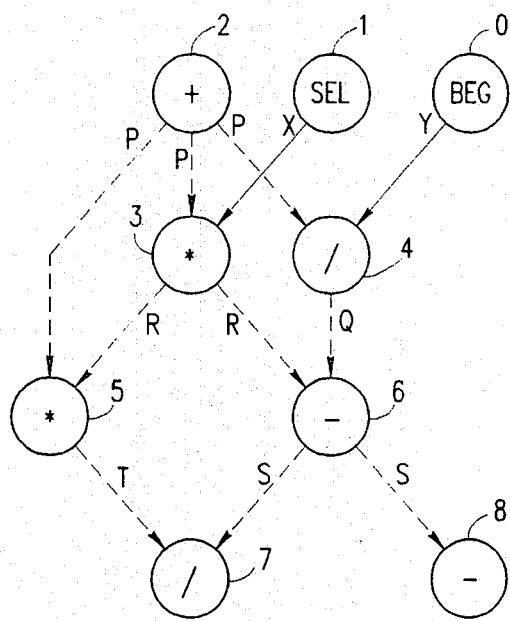
FIGS. 3A–3D are pictorial illustrations of four consecutive states of a graph of a code block, useful in understanding the operation of the dataflow machine of FIG. 1.

Furthermore, for each state of FIGS. 3A–3D, the bitstring corresponding to each node and indicating executable successor nodes is listed as is the operand data which is available at that state. A bitstring 200 for node 2 in FIG. 3A is [0 1 1] indicating that successor node 5 is unexecutable but successor nodes 3 and 4 are executable. The bitstrings for the other nodes in FIG. 3A have no set bits since none of the operands are available.

Figure 3B:
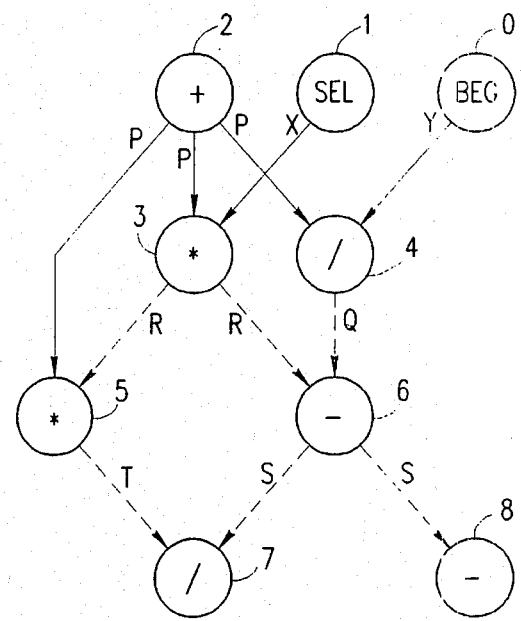

In the first cycle, which produces the state of FIG. 3B, the lookahead unit 108 (FIG. 1) provides the instruction of node 2 to the instruction queue 110. The execution unit 100, upon executing the instruction of node 2, produces the result P.

In the same cycle, the lookahead unit 108 selects, in response to reading the bitstring 200, to continue the current path process with node 4. The lookahead unit 108 then accesses memory 104 to obtain the instruction packet, bitstring 202 and outside operand Y for the instruction of node 4.

It will be noted that the current path process could equally have continued with node 3 which is also executable according to bitstring 200.

Memory 104 comprises three sections, an instruction section 120, a bitmap section 122 and a outside operand section 124. The three sections 120–124 are "congruent" such that an address in a first section located a predetermined number of addresses from the start of the first section corresponds to an address in a second section located the same predetermined number of addresses from the start of the second section.

Therefore, an instruction in the fourth location of instruction section 120 is the instruction for node 4 and a bitstring in the fourth location of bitmap section 122 is the bitstring for node 4.

The outside operands are stored in the location in outside operand section 124 corresponding to the instruction whose result they are. Therefore, the outside operand Y, needed for the instruction of node 4 and produced by node 0, is stored at address 0 of outside operand section 124.

It will be noted that the locations in their respective sections of memory 104 of instructions, bitstrings and results are indicated in FIG. 4.

Figure 3D:
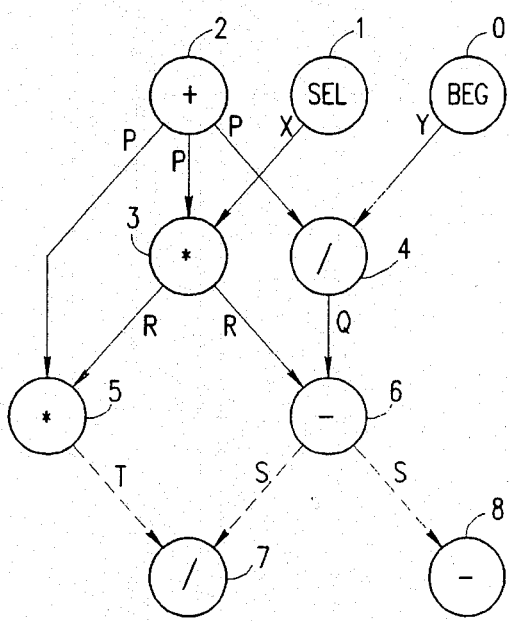
Figure 3C:
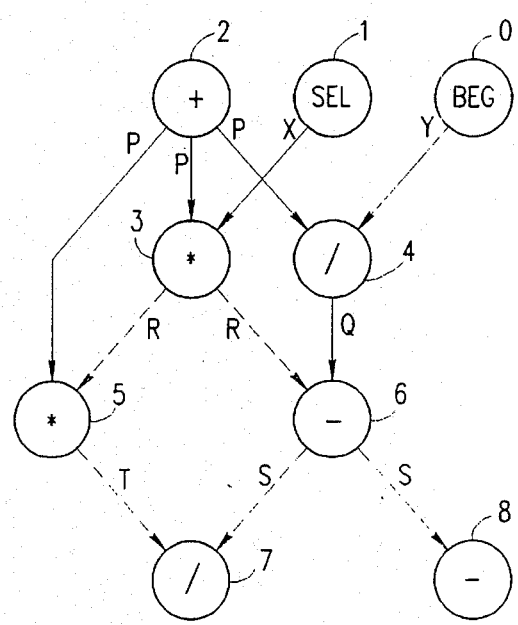

In the second cycle, which produces the state of FIG. 3C, the lookahead unit 108 provides the instruction for node 4 to the instruction queue 110. The execution unit 100 produces the result Q.

However, bitstring 202, belonging to node 4, is [0 0 0], indicating that there currently are no executable successor nodes. Therefore, the current path process is terminated.

During the second cycle, the write result unit 102 processes those successors of node 2 not on the current path process. For successor node 5, the unit 102 writes the result of node 2, the value P, to location 2 of outside operand section 124.

Upon processing successor node 3, it notes that the bitstring 200 indicates that node 3 is executable. Therefore, it accesses outside operand memory 124 for the outside operand X which is the result of node 1. The write result unit 108 then places the instruction of node 3, the result P and the outside operand X, and the bitstring 204 into the new path process queue 106.

The write result unit 102 also updates the bitstrings for the second predecessor nodes of those successor nodes of node 2 which are not executable. Therefore, the write result unit 102, upon processing successor node 5, updates the bitstring 204 of second predecessor node 3.

In the third cycle, which produces the state of FIG. 3D, a new path process is begun with node 3. The lookahead unit 108 provides the instruction of node 3, with the operand values P and X, to the instruction queue 110. The execution unit 100, upon executing the instruction of node 3, produces the result R.

In the same cycle, the lookahead unit 108 has to select the next node in the current data dependent path process. In FIG. 3, there are two possible successor nodes, node 5 whose outside operand was provided by node 2, or node 6 whose outside operand was provided by node 4.

However, in FIG. 4, the bitstring 204 of node 3 only indicates that successor node 5 is available. The write result unit 102 is about to, but has not yet, updated the bitstring 204 to include the results of cycle 2, the execution of the instruction of node 4. This is known as a "collision", where both the lookahead unit 108 and the write result unit 102 access the same bitstring in the same cycle.

To prevent collisions, a write result history buffer 302 (FIG. 5), described in more detail hereinbelow, is maintained and, to increase performance speed a lookahead history buffer 300 is maintained. The two buffers both contain information from the last k instructions executed or about to be executed, where k is generally less than or equal to The lookahead history buffer 300 is read by the lookahead unit 108. Each record of buffer 300 contains an address of an instruction whose outside operand will be made available by the future execution of one of the last k instructions sent to be executed and a bitstring for the instruction contained therein indicating the availability of its outside operand.

By providing the lookahead unit 108 with information regarding the instructions which are queued to be executed, but have not yet executed, the lookahead history buffer 300 enables the lookahead unit 108 to avoid terminating a path process earlier than necessary.

The write result history buffer 302 is read by the write result unit 102. Each record of buffer 302 contains the address of an executed instruction and its result.

By providing the write result unit 102 with information regarding instructions which have executed but have not yet been written, the buffer 302 enables the write result unit 102 to avoid collisions.

It will be noted that the lookahead history buffer 300 is larger than the write result history buffer 302.

For example, for the second cycle in which node 4 executed, the address of node 3 is sent to the lookahead history buffer 300 with the bitstring [0 10]. In the same cycle, after execution, the execution unit 100 writes the address of node 4 with the result Q. The result Q is later written, by write result unit 102, to location 4 of outside operand section 124.

Therefore, on each cycle, the lookahead unit 108 accesses buffer 30C to determine if there are any successor instructions which have recently executed and whose results might not have been reflected in the bitstring stored in bitmap section 124 of memory 104.

If there is a relevant record in the history buffer, the bitstring from the history buffer 300 is utilized instead of the bitstring stored in memory 104.

In the example shown in FIGS. 3A–3D and 4, on the third cycle in which node 3 is to execute, the lookahead unit 108 looks and finds in the lookahead history buffer 300 the address of node 3 with the bitstring [0 1 0] indicating that the second successor node, node 6, is available. Node 6 is selected as the successor instruction of the path process.

The write result unit 102, upon later processing node 5 as a successor node of node 3, places the instruction, updated bitstring and operands of node 5 on the new path process instruction queue 106.

Reference is now made to FIG. 5 which details the architecture of the dataflow machine 50. The machine 50 comprises a plurality of new path process instruction queues 106, lookahead units 108 and instruction queues 110, each executing a different path process. Four of each of elements 106–110 are shown in FIG. 5. The queues 106 and 110 are typically formed of FIFO buffers.

It will be appreciated that a minimal number of path processes must be executing in order to ensure that the results of one path process are available as outside operands for another path process.

Each lookahead unit 108 follows a single path process from beginning to end. The operation of the lookahead units 108 is described in more detail hereinbelow.

Two fetch units 304, comprised of combinational logic, arbitrate among the instruction queues 110 to select an instruction to be executed by the execution unit 100. Typically, one fetch unit 304 is active at a time, taking instructions from whichever of the two instruction queues 110 which feed it is available using a suitable arbitration policy. Control is given to the other fetch unit 304 only when the active queue reaches a resting state. The changing of control is noted in FIG. 5 by "miss" signals sent between the fetch units 304.

The active fetch unit 304 also updates the lookahead history buffer 300 with information from the selected instruction. For each second predecessor instruction of the selected instruction, the active fetch unit 304 places a packet comprising two pieces of information at the top of the queue in buffer 300, 1) its address and 2) a bitstring for the second predecessor instruction having a set bit in the appropriate location corresponding to the currently selected instruction.

Buffers 300 and 302 are FIFO buffers and therefore, for each packet placed into them, the oldest packet is removed. History buffer 300 has one write port, for writing by the active fetch unit 304, and three read ports, for reading by the lookahead units 108, as described in more detail hereinbelow. The ports are simultaneously accessible.

The packets in the lookahead history buffer 300 are accessible to the lookahead unit 108, as described in more detail hereinbelow and as noted by the arrows labeled 305.

The selected instruction is provided to the execution unit 100, comprised of an Arithmetic Logic Unit (ALU) 308 and path process registers 310 storing the active operand of each path process. Each instruction, labeled 306, is comprised of the following components, detailed in FIG. 5:

a) OP CODE: The operation code of the instruction;

b) path process number: the number of the lookahead unit 108 which placed the instruction in the instruction queue; for the example shown in FIG. 5, the path process number ranges between 1 and 4;

c) outside operand: the value of the outside operand of the instruction;

d) fetch source: the number of the fetch unit 304 which selected the instruction;

e) bitstring: the bitstring of the instruction;

f) bitmap base address: the first address of bitmap section 122;

g) block frame base address: the first address of the outside operand section 124;

h) DL (dynamic link): the address of the code, if any, from which the present code block was called;

i) successor information: list of successors, list of second predecessors of the instruction; and j) second predecessor index: the position of this successor instruction for each predecessor instruction of the current instruction.

The ALU 308 uses the path process number to determine the location in the path process register 310 where the active operand for the corresponding path process is stored. If the a flag indicates that the value of the outside operand is in buffer 302, the ALU 308 retrieves the outside operand from the write result history buffer 302. The ALU 308 then applies the operation indicated by the OP CODE to the active operand retrieved from the path process register 310 and to the outside operand either retrieved from the history buffer 302 or received with the instruction 306.

Using the path process number, the ALU 308 writes the result of the operation, or "the executed instruction", into the appropriate location in the path process register 310. The ALU 308 also writes the result and the address of the executed instruction to write result history buffer 302.

The result and elements d–i of the instruction 306 form a result packet which, as shown in FIG. 5, is provided to one of a plurality of write result queues 312, formed of FIFO buffers, each providing a result packet to a write result unit 102.

The write result unit 102 processes the result packet in order to process those successor instructions not selected as continuing the path process. For each successor instruction, the write result units 102 either write the result to the appropriate location in the outside operand section 124 and update the bitstring of the second predecessor instruction or provide the successor instruction, its outside operand, the result and an updated bitstring of the successor instruction as a new path process instruction to the new path process queue 106.

As described hereinabove, if the executed instruction has at least one second predecessor instruction which executed shortly before the executed instruction, the operation of the write result units 102 regarding the successor instructions of the executed instruction might be incorrect.

Therefore, the ALU 308 writes the address and result of any executed instruction into the write result history buffer 302. If a successor instruction has no set bit, before processing it, the write result units 102 access the write result history buffer 302 to determine if a outside operand of the successor instruction is currently available, even though the bitstring of the executed instruction indicates that the outside operand is not available.

Buffer 302 operates as follows: the write result units 102 provide buffer 302 with the address of the second predecessor instruction of the successor instruction and the buffer 302 compares the address provided to it with the addresses stored within it.

As mentioned hereinabove, buffer 302 has four simultaneously accessible ports. One for writing by the ALU 308, and three for reading. The ALU 308 uses one read port and the two write result units 102 use the other two read ports.

The write result units 102 read from and write to sections 122 and 124 of the memory 104 via an arbiter 314. The arbiter 314 arbitrates between memory access requests of the write result units 102 and those of the lookahead unit 108.

The memory 104 typically is comprised of high speed four port Random Access Memories (RAMs), such as the IDT 7052S or IDT 7052L manufactured by Integrated Device Technology, Inc. of the U.S.A. Two of the ports are for writing by the two write result units 102 and two of the ports are for reading by any two of the four lookahead units 108.

Each lookahead unit 108 receives with a new path process instruction the instruction packet, the active and outside operands and the bitstring for the instruction. If the bitstring for the instruction is not up-to-date, the lookahead unit 108 reads bitmap section 122 for the latest version of the bitstring. The lookahead unit 108 then continues operation as for an instruction in the path process.

For an instruction in the path process, the lookahead unit 108 provides the lookahead history buffer 300 with the address of the current instruction to determine if any of the successors of the instruction have recently been sent to the ALU 308. If so, the buffer 300 provides the lookahead unit 108 with the first instance of a bitstring for the current instruction.

In parallel with the access to the lookahead history buffer 300, the lookahead unit 108 accesses the memory 104, via arbiter 314, to read the bitstring of the current instruction. The two bitstrings are OR'd together to provide the latest version of the bitstring of the current instruction.

Based on the OR'd bitstring, the lookahead unit 108 selects a successor instruction, provides the current instruction to the instruction queue 110 and then accesses the memory 104 for the instruction, bitstring and outside operand of the successor instruction and, in parallel, accesses the history buffer 300 for the bitstring, if it exists, of the successor instruction. The process described hereinabove is repeated for each successor instruction.

Reference is now made to FIG. 6 and Annex A which respectively are a state diagram of the operations of the lookahead unit 108 and pseudocode describing the state diagram for describing, in detail, the operation of each lookahead unit 108.

The lookahead unit 108 attempts, on every clock cycle, to add one executable instruction to the instruction queue 110. This is not possible with all instructions, as will be described hereinbelow. The lookahead unit 108 operates as follows:

When processing an instruction, the lookahead unit 108 first decodes, in state 900, the operation code (OP CODE) of the instruction. For regular instructions, the lookahead unit 108 proceeds to state 902. The operations for regular instructions are detailed in sections 1.1.1, 1.2, 1.3 and 1.4 of Annex A.

For BRANCH instructions, with which the program jumps to a new code block as a result of a conditional, the lookahead unit 108 proceeds to state 904. The BRANCH instruction operations are detailed in section 1.1.5 of Annex A.

For an APPLY instruction, with which a function or subroutine is called, the address of the new code block is obtained. The APPLY instruction operation starts at state 906 and is detailed in section 1.1.2, continuing in section 1.1.1, of Annex A.

A BEGIN instruction, beginning at state 908, generally immediately follows an APPLY instruction. The BEGIN instruction allocates memory space for the bitmap section 122 and outside operand section 124 of the new code block called by the APPLY instruction. The BEGIN instruction is detailed in sections 1.1.3 and 3.

Finally, the TERMINATE instruction, beginning at state 910, returns to the location from which the BRANCH instruction jumped. The TERMINATE instruction is detailed in sections 1.1.4 and 2 of Annex A.

For regular instructions, the lookahead unit 108 first checks (in state 902) that the instruction is a new path process instruction. The unit 108 then checks that the bitstring of the new path is up-to-date. If not, unit 108 proceeds to state 914.

For all regular instructions, in state 912, there is a check that on the previous clock, a decision was made to access bitmap section 122 (FIG. 1) for the latest written version of the bitstring of the current instruction.

The lookahead unit 108, in state 914, reads the latest written bitstring of the instruction from bitmap section 122. This step is skipped only if the new path process queue is empty and the new path process instruction is received immediately after being written by one of the write result units 102. The instruction is now ready to be processed on the next clock cycle. The line 915 indicates a return to the main state at the next clock cycle. In this case, the instruction is the current instruction.

For instructions which are ready to be processed, the lookahead unit 108 OR's the bitstring received from the bitmap section 122 with a history buffer bitstring, if one was received from the lookahead history buffer 300 as described in more detail hereinbelow. This provides the lookahead unit 108 with a completely up-to-date bitstring.

Using the bitstring information, the lookahead unit 108 attempts to select a successor instruction in state 916.

If a successor instruction is found, the lookahead unit 108, in state 918, puts the current instruction and its outside operand into the instruction queue.

In state 920 the lookahead unit 108 obtains from memory 104 the successor instruction and its bitstring and outside operand. In parallel, the unit 108 searches the lookahead history buffer 300 for the first occurrence of the address of the present instruction put there by previously executed second predecessor instructions. This becomes the history buffer bitstring which, as described hereinabove, will, on the next clock, be OR'd with the bitstring received from bitmap section 122. The unit 108 provides these elements as the current instruction information for the next cycle, as indicated by line 915.

If, as checked by state 921, there are no executable successor instructions (i.e. there are no set bits in the bitstrings of the successor instructions), then, if there are no instructions in the instruction queue 110, the path process is to be terminated. If there are instructions left in the instruction queue 110, then the lookahead unit 108 waits one cycle to see if the write result unit 102 has, in the meantime, updated the bitstring for the current instruction.

Therefore, if the instruction queue 110 is not empty, as checked by state 922, the lookahead unit 108 sets a retry flag to get the latest version of the bitstring of the current instruction on the next instruction and waits until the next clock cycle, processing the present instruction on that cycle. If the second predecessor instruction has executed in the meantime, as will be discovered during the next clock cycle, then the present instruction can, at that time, be sent to the instruction queue 110.

If the instruction queue 110 is empty, then the lookahead unit 108 terminates the path process, in state 924, by putting the current instruction into the instruction queue 110 and requests, in state 926, a new path process instruction from the new path process instruction queue 106.

For the BRANCH instruction (state 904), which branches as a result of a conditional, the lookahead unit 108 sends the BRANCH instruction to the instruction queue 110 and requests a new path process instruction, in state 930, from the new path process instruction queue 106. Since the successor of the BRANCH instruction is not defined until the BRANCH instruction executes, the lookahead unit 108 cannot continue the path process and it therefore terminates the path process and starts a new path process with the next new path process instruction in new path queue 106.

The APPLY instruction is found at the beginning and end of a called code block. If the APPLY instruction is a beginning APPLY instruction, the unit 108 gets the address of the new code block to be implemented. The address is one of the operands of the APPLY instruction. For ending APPLY instructions, the lookahead unit 108 behaves as if the APPLY instruction is a regular instruction.

The instruction following the beginning APPLY instruction is the BEGIN instruction. In one clock it requests memory allocation for the new outside operand section 124 and for the new bitmap section 122. On a second clock, indicated by dotted lines, the lookahead unit 108 is in a "begin state", waiting for the memory allocation to complete.

Once the memory has been allocated, the lookahead unit 108, in state 934, checks that the flags are in the proper state, as set on the previous clock cycle, and if they are, it stores the address from which the APPLY instruction jumped as the DL parameter of the instruction 306 (FIG. 5). In states 936–940, the unit 108 selects the first successor instruction of the BEGIN instruction, places the BEGIN instruction on the instruction queue 110 and reads the successor information. The state is returned to the main state and therefore, on the next clock, the path process is continued with regular instructions.

In response to the TERMINATE instruction, the lookahead unit 108, in state 910, requests release of the outside operand section 124 and the bitmap section 122 of memory 104. It also obtains the return address to which the code is to be returned.

On the next cycle, the lookahead unit 108 is in a "terminate state". The lookahead unit 108, in states 942 and 944, reads the information regarding the successor instruction, which is typically an ending APPLY instruction corresponding to the beginning APPLY instruction and having the same successors, and then resets the APPLY instruction indicator, indicating that the program can continue with the successor instructions of the APPLY instruction.

Whenever the dataflow machine 50 is turned on, the lookahead unit 108 is in a reset state (not shown in FIG. 6) during which its internal values are set and a fixed location in memory, storing the initial program load instruction, is read. The lookahead unit 108 is then placed into the main state.

Reference is now made to FIG. 7 and Annex B which respectively are a state diagram of the operations of each write unit 102 and pseudocode describing the state diagram for detailing the operation of each write result unit 102.

Each write result unit 102 is a three stage pipeline. The first stage performs preparatory operations and a search of the history buffer, the second stage accesses memory 104 and the third stage sends an instruction to the new path process queue 106 and prepares for the next cycle of the write result unit 102. Each stage operates concurrently with the other stages, each operating on a different successor instruction. When no successors of the current instruction remain to be processed, the next instruction is read into the first stage. However, at the same time, the other stages typically are working on successor instructions of the previous instruction.

The write result unit 102 begins by determining if the current instruction is new to it. If so, in stage 950, it decodes the OP CODE, performing one set of operations for an APPLY instruction, another for a BRANCH instruction and another for the remaining types of instructions.

If the instruction is an APPLY instruction, meaning that a function has been called and a new code block accessed, the write result unit 102 begins storing the return address of the function in the address of the APPLY instruction in the outside operand section 124. In stage 952, the write result unit 102 marks all of the successors of the APPLY instruction (which are the instructions succeeding the function call) as being unnecessary until after the TERMINATE instruction finishes.

If, on this clock, the write result unit 102 has a flag to perform the memory access stage, the write result unit 102 freezes the pipeline for one clock to enable the memory access of this stage to finish. The waiting of a clock is indicated in FIG. 7 by the line 954. Otherwise, unit 102 continues, at stage 956, with the history buffer search part of the first stage.

If the new instruction is a BRANCH instruction, the successor of the BRANCH instruction is selected, based on the result of the branching condition, and the remaining successors are marked as currently not the direction in which processing is continuing. The write result unit 102 then continues, at stage 956, with the history buffer search part of the first stage.

For all other instructions, the write result unit 102 effectively goes immediately to the history buffer search part of the first stage. This is shown in FIG. 7 by setting the history buffer search flag, in stage 953, and then checking to see that it is set in stage 956.

In the history buffer search section, if a search of the history buffer is not desired such as occurs with an APPLY instruction, meaning that no processing of successors is to be performed, a memory access flag is reset so that the memory access stage will be skipped. Otherwise, the memory access flag is set.

The instruction comes to the history buffer search section with a selected successor instruction indicated. The selected successor instruction is never the instruction succeeding the current instruction along the data dependent path process since the write result unit 102 only processes those successors not chosen to continue the path process.

If the selected successor has a corresponding set bit, as checked in stage 958, there is no need to search the history buffer 302. The outside operand of the successor instruction is stored in memory 104 and will be accessed on the next cycle, in the memory access stage. The value of a variable op_value is set to nil.

If the bit corresponding to the selected successor is not set, then a search is performed in the write result history buffer 302 for the address of the second predecessor of the selected successor instruction address. If the address is found, the bit corresponding to the selected successor is set and the value of the result stored with the address is provided and held in the variable op_value. Assuming that memory access is desired, the instruction proceeds to the memory access stage on the next cycle.

In the memory access stage, beginning in stage 960, if the bit corresponding to the successor instruction is set, and if the variable op_value currently has a value of nil, indicating that no search of the history buffer 302 was performed, the outside operand section 124 of memory 104 is accessed. If the history buffer 302 was searched, then there is no need to access memory 104.

In stage 962 the instruction section 120 and the bitmap section 122 of memory 104 are accessed for the successor instruction and its bitstring. Since the successor instruction has a outside operand available, the successor instruction will become a new path process instruction and therefore, will be operated upon in the third stage.

If the Sit corresponding to the selected successor is not set, the result of the current instruction has to be stored until the second predecessor of the selected successor executes. Since there may be many such successor instructions and since the data is written to only one location in outside operand section 124 (the location corresponding to the current instruction), the result is only written for the first such successor instruction.

For all such successor instructions, the bitstring corresponding to the second predecessor instruction is updated, in stage 964, to indicate that the outside operand, of the second predecessor instruction, is available. Since the successor instruction is not executable, a new path process flag is not set.

The third stage, placing a new path process on the new path process instruction queue 106 and preparing for the next cycle through the three stages, begins with stage 966. If a new path process instruction is to be prepared, the OP CODE, result, outside operand and current bitstring are provided as a new path process instruction.

If there are more successor instructions to be processed, the history search flag is set and the next successor instruction to be processed is selected. Otherwise, the next instruction from the write result queue 312 (FIG. 5) is selected. Annex C is a pseudocode describing the operation of the history buffers 300 and 307. It is believed to be self-explanatory.

Annex D is a specification of an instruction set, including the instructions described hereinabove, useful with dataflow machine 50. It is believed to be self-explanatory.

It will be appreciated by persons skilled in the art that the present invention is not limited to what has been particularly shown and described hereinabove. Rather the scope of the present invention is defined only by the claims which follow.

ANNEX A

```
LOOKAHEAD unit description:              Date:   05/01/92
---------------------------- input:
------

NEW_INSTRUCTION_QUEUE

NEW_INSTRUCTION_QUEUE_EMPTY_PULSE
/* #Description: A true value means queue is empty.                            */

INSTRUCTION_QUEUE_EMPTY_PULSE
/* #Description: A true value means queue is empty.                            */

LOOKAHEAD_ACTIVATION_RECORD_ALLOC_READY_PULSE
/* #Description: A true value means memory allocation has been terminated.     */

LOOKAHEAD_BITMAP_ALLOC_READY_PULSE
/* #Description: A true value means memory allocation has been terminated.     */

LOOKAHEAD_ACTIVATION_RECORD_ALLOC_ADDR

LOOKAHEAD_BITMAP_ALLOC_ADDR
/* #Description: Starting allocated address.                                   */ output:
-------

INSTRUCTION_QUEUE

LOOKAHEAD_ACTIVATION_RECORD_SIZE
LOOKAHEAD_BITMAP_SIZE
/* #Description: Memory size required.                                         */ internal registers:
-------------------

INSTR_QUE_RCRD_INPUT:         INSTR_QUE_RCRD   /* Working register for         */
/* LOOKAHEAD; Includes current memory access address (WORK in statediagram).*/

INSTR_QUE_RCRD_OUTPUT:        INSTR_QUE_RCRD   /* memory Data Register         */
  /                                            /* for current LOOKAHEAD.       */
                                               /* (MDR in state diagram).      */

Fields: INSTR_ADDR, BITMAP_FRAME, SUC_INSTR_ADDR, AR_ADDR, DYNAMIC_LINK,
        ARG2,ALT_PRED_INSTR_ADDR, ARG_OFFSET, SUC_NUM,
        ARG_NUM,ARG_PORT,ARG1_ORG,ARG1_REG_ADDR states:
 main_lookahead_state, terminate_lookahead_state, begin_lookahead_state,
 reset_lookahead_state

LOOKAHEAD_UNIT_STATE
``` internal status variables:
----------------------------

```
READY_BITMAP_NON_ZERO_STATUS:      BOLLEAN
/* #Description: A true value means a non zero BITMAP.                      */

OPEN_NEW_PATH_PROCESS_STATUS:              BOOLEAN
/* #Description: A true value means new path.                               */

READY_BITMAP_STATUS:               BOOLEAN
/* #Description: A true value means that the BITMAP value read from the     */
/* LOOKAHEAD_INSTRUCTION_INPUT_QUEUE is valid.                              */

AR_ALLOC_STATUS: BOOLEAN
/* #Description: A true value means that Activation Record allocation       */
/*               process has been terminated.                               */

BITMAP_ALLOC_STATUS:               BOOLEAN
/* #Description: A true value means that BITMAP memory allocation           */
/*               process has been terminated.                               */

BEGIN_ALLOC_START_STATUS:          BOOLEAN
/* #Description: A true value means that the memory allocation has been     */
/*               started.                                                   */

APPLY_START_STATUS:                BOOLEAN
/* #Description: A true value means that the APPLY instruction starts.      */
```

)KAHEAD algorithm:
--------------------

The LOOKAHEAD unit operates as a synchronized state machine.
On every clock pulse perform:

Case LOOKAHEAD_UNIT_STATE is

1. Case LOOKAHEAD_UNIT_STATE = main_lookahead_state 1.1  Case OP_CODE is 1.1.1  OP_CODE = regular instruction

```
      If OPEN_NEW_PATH_PROCESS_STATUS = true then
         OPEN_NEW_PATH_PROCESS_STATUS = false
         INSTR_QUE_RCRD_INPUT =
                      Information read from NEW_INSTRUCTION_QUEUE
         /*******************************************************************/
         /* When new path dropped through empty input queue, the BITMAP     */
         /* supplied with it by Write-Result is still valid.                */
         /*******************************************************************/
         READY_BITMAP_STATUS = NEW_INSTRUCTION_QUEUE_EMPTY_PULSE End
      If READY_BITMAP_STATUS = true then
         DO bit map history update (1.2).
         Attempt to select the first non zero bit from READY.
         If READY_BITMAP_NON_ZERO_STATUS = true THEN
            INSTR_QUE_RCRD_INPUT = INSTR_QUE_RCRD_OUTPUT
            Write INSTR_QUE_RCRD_OUTPUT to INSTRUCTION_QUEUE.
            DO Initiate read successor information (1.3)
         Else
            If INSTRUCTION_QUEUE_EMPTY_PULSE = true THEN
               CHOSEN_NUMBER = "last marker" /* Tells FETCH unit: Path has
                                                ended.                      */
               Write INSTR_QUE_RCRD_OUTPUT to INSTRUCTION_QUEUE.
               OPEN_NEW_PATH_PROCESS_STATUS = true
            ELSE
               DO read current instruction BITMAP(1.4).
            End
      End
      Else  /* READY_BITMAP_STATUS = FALSE.                                  */
         DO read current instruction BITMAP(1.4).
      End
```

1.1.2  OP_CODE =  APPLY instruction

```
        IF APPLY_START_STATUS = true
          The LOOKAHEAD units transfers control to the function address which
          may be either a constant (CNST) or given as an argument (ARG1).
          Initiate a read to get address where control is transferred from the
          instruction memory.
        Else
          DO regular instruction (1.1.1).
        End 1.1.3  OP_CODE = BEGIN instruction If BEGIN_ALLOC_START_STATUS = true then The LOOKAHEAD unit requests memory allocation for the new
          activation record and BITMAP memory for the called function.
          CNST holds Activation records' size .
          Request DATA and BITMAP memory allocation using
                LOOKAHEAD_AR_SIZE and LOOKAHEAD_BITMAP_SIZE
          AR_ALLOC_STATUS = false
          BITMAP_ALLOC_STATUS = false
          next_state = begin_lookahead_state End 1.1.4  OP_CODE = TERMINATE instruction Requests memory release of the Activation Record and BITMAP.
        Get return address
        next_state = terminate_lookahead_state 1.1.5  OP_CODE = BRANCH instruction Write INSTR_QUE_RCRD_INPUT to the INSTRUCTION_QUEUE.
        OPEN_NEW_PATH_PROCESS_STATUS = true 1.2 bit map history update If search in the History Buffer succeeded then
        ARG1_REG_ADDR = address in History Buffer where matching occured.
        ARG1_ORG = true
        H_BITMAP = contents of the entry in the History Buffer.
    Else
        ARG1_ORG = false
        H_BITMAP = zero bit string
    END
    READY = H_BITMAP or BITMAP read from its memory.

1.3 Initiate read successor information

IF ARG1_ORG = false THEN
        Initiate a read request to get its second argument from the
        data memory. The argument may be read either from the current
        activation record pointed by AR_ADDR or from the previous one
        which is pointed by the DYNAMIC_LINK. Selection is performed by the
        ARG_ADDR_SRC. The offset to the activation record frame address is
        ARG_OFFSET.
    END
        Initiate a read request to read the BITMAP memory.
        BITMAP address = SUC_INSTR_ADDR + BITMAP_FRAME.
        Initiate a search along the History Buffer to find the BITMAP.
        The key for searching = BITMAP address.
        Set the chosen successor number (CHOSEN_NUMBER).

Initiate a read to get successor's instruction from the instruction
        memory (using SUC_INSTR_ADDR).

1.4 Initiate read current instruction BITMAP

Initiate a read request to read the BITMAP memory.
    BITMAP address = INSTR_ADDR + BITMAP_FRAME.
    Initiate a search along the History Buffer to find the BITMAP.
    The key for searching = BITMAP address.
    Set the chosen successor number (CHOSEN_NUMBER).

2. Case LOOKAHEAD_UNIT_STATE = terminate_lookahead_state

DO Initiate read successor information (1.3).
    APPLY_START_STATUS = false
```

```
    next_state = main_lookahead_state

3. LOOKAHEAD_UNIT_STATE = begin_lookahead_state
   If AR_ALLOC_STATUS = false then
       If LOOKAHEAD_AR_ALLOC_READY_PULSE = true then
           AR_ALLOC_STATUS = true
           DYNAMIC_LINK = AR_ADDR
           AR_ADDR = LOOKAHEAD_AR_ALLOC_ADDR
       End
   End
   If BITMAP_ALLOC_STATUS = false
       If LOOKAHEAD_BITMAP_ALLOC_READY_PULSE = true
           BITMAP_ALLOC_STATUS = TRUE
           BITMAP_FRAME = LOOKAHEAD_BITMAP_ALLOC_ADDR
       End
   End
   If ( BITMAP_ALLOC_STATUS = true ) and ( AR_ALLOC_STATUS = true     ) then
       Select the first successor of the BEGIN instruction as ready.
       DO Initiate read successor information (1.3)
       next_state = main_lookahead_state
   End 4. LOOKAHEAD_UNIT_STATE = reset_lookahead_state next_state = main_lookahead_state
   Setup initial values to variables and status.
   Initiate a read of a fixed location in instruction memory.
```

```
Write-Result description:                    Date: 05/01/92
------------------------- input:
-----

WRITE_RESULT_INPUT_INSTRUCTION_QUEUE
Write_Result_History_Buffer
Write_Result_HISTORY_HIT_PULSE output:
------

NEW_INSTRUCTION_QUEUE
BITMAP_MEMORY
DATA_MEMORY internal registers:
-------------------

INSTR_QUE_RCRD_REG0:      INSTR_QUE_RCRD
  INSTR_QUE_RCRD_REG1:      INSTR_QUE_RCRD
  INSTR_QUE_RCRD_REG2:      INSTR_QUE_RCRD

Fields:  INSTR_ADDR, BITMAP_FRAME, SUC_INSTR_ADDR, AR_ADDR, DYNAMIC LINK,
           ARG2,ALT_PRED_INSTR_ADDR, ARG_OFFSET, SUC_NUM, SUC_INSTR_ADDR,
           ARG_NUM,ARG_PORT,ARG1_ORG,ARG1_REG_ADDR internal status variables:
--------------------------

HISTORY_SEARCH_STATUS:          BOOLEAN
/* #Description: A true value means search in the history buffer required in */
/*               this clock.                                                 */

MEMORY_ACCESS_STATUS            BOOLEAN
/* #Description: A true value means memory access read/write required in     */
/*               this clock.                                                 */

MAKE_NEW_PATH_STATUS:           BOOLEAN
/* #Description: A true value means making a new path required in            */
/*               this clock.                                                 */
MORE_SUCESSORS_STATUS:          BOOLEAN
/* #Description: A true value means more successors to perform Write-Result. */

FIRST_SUCCESSOR_STATUS:         BOOLEAN
/* #Description: A true value means that writing result to the data memory   */
/*               is required.                                                */

NEW_INSTRUCTION_STATUS:         BOOLEAN
   #Description: A true value means a new instruction has been input from    */
/*               the queue.                                                  */

Write-Result Algorithm:
-----------------------

Write-Result unit is a 3 stage pipeline.

!----------------------------------------------------------!
       ! History Buffer Search | Memory Access | Format New Path  |
  ---->|      Stage 1          |    Stage 2    |    Stage 3       |---->
       !----------------------------------------------------------!
```

Each stage operates in overlapped fashion on a different successor of the
current instruction. When no further successors remain to be processed for the
current instruction, next instruction is read into stage 1. Thus, the pipeline
may be processing successors of different instructions concurrently.
The three status variables HISTORY_SEARCH_STATUS, MEMORY_ACCESS_STATUS and
MAKE_NEW_PATH_STATUS indicate at each clock if there is work to be done in the
corresponding stage. If status of stage<i> is set at the current clock, status
of stage<i+1> must be set for the next clock, and conversly.
The three registers instruction INSTR_QUE_RCRD_REG0,1 and 2 are the working
latches for the three pipeline stages.

```
If NEW_INSTRUCTION_STATUS then   /* A new instruction enters w/CHOSEN_NUMBER   */
                                 /* marked. The MORE_SUCCESSORS_STATUS is true */
                                 /* if at least one successor not marked.      */
    Using INSTR_QUE_RCRD_REG0 DO
    Case OP_CODE is OP_CODE = BRANCH   /* Select successor according to condition code (ARG2) */
                           /* Marks all others.                                   */
            Selects a conditional successor (using ARG2).
            HISTORY_SEARCH_STATUS = true
            Mark all others OP_CODE = APPLY
            HISTORY_SEARCH_STATUS = false
            Store return address in caller AR.  /* storing return address will */
                                                /* occupy data memory port this clock. */
            MORE_SUCESSORS_STATUS = false
            If MEMORY_ACCESS_STATUS = true then  /* If pipeline requires memory */
                exit state                       /* access.                     */
                                                 /* freeze pipeline until next clock. */
            End OP_CODE = regular instructions  /* Begin & Terminate instructions are */
                                        /* treated as regular by Write-Result. */
            HISTORY_SEARCH_STATUS = true
    End Case
End If HISTORY_SEARCH_STATUS = true THEN
    MEMORY_ACCESS_STATUS = true
    Using INSTR_QUE_RCRD_REG0 DO /*****************************************************************/
    /* Relevant fields moved to next Write-Result stage on next clock. */
    /*****************************************************************/
    INSTR_QUE_RCRD_REG1 = INSTR_QUE_RCRD_REG0

If (BITMAP: bit successor # = 1) then  /* The argument will not be in the */
        op_value = nil                     /* history buffer.                 */
    Else
        /* Perform history search. */
        Initiate a search along the History Buffer to find the alternate
        predecessor's input value. The key for searching =
                ALT_PRED_INSTR_ADDR + BITMAP_FRAME op_value -> INSTR_QUE_RCRD_REG1  /* On next clock. */
    End
Else
    MEMORY_ACCESS_STATUS = false
End If MEMORY_ACCESS_STATUS = true then
    Using INSTR_QUE_RCRD_REG1 DO
        /* There is a need to read the Data memory. */
    If (BITMAP: bit successor # = 1) then
        MAKE_NEW_PATH_STATUS = true
        READ_MEM:
        If op_value = nil then
            Initiate a read request to get its second argument from the
            data memory. The argument may be read either from the current
            activation record pointed by AR_ADDR or from the previous one
            which is pointed by the DYNAMIC_LINK. Selection is performed by
            the ARG_ADDR_SRC. The offset to the activation record frame
            address is ARG_OFFSET
        End
        Initiate a read request to read the BITMAP memory.
        BITMAP address = SUC_INSTR_ADDR + BITMAP_FRAME.

Initiate a read to get successor's instruction from the instruction
        memory (using SUC_INSTR_ADDR).
        /*****************************************************************/
        /* Relevant fields moved to next Write-Result stage on next clock. */
        /* All the returned data -> INSTR_QUE_RCRD_REG2.                   */
        /*****************************************************************/
    Else
        WRITE_MEM:
        If FIRST_SUCCESSOR_STATUS = true
```

```
         Write result to data memory at AR_ADDR + INPUT_ARG_ADDR
         FIRST_SUCCESSOR_STATUS = false
      End
      MAKE_NEW_PATH_STATUS = false
      Write to BITMAP memory at BITMAP_FRAME + ALT_PRED_INSTR_ADDR
               '1' in the bit#ALT_PRED_INDX
   End If MAKE_NEW_PATH_STATUS = TRUE then
   /*********************************************************************/
   /* Relevant fields moved to next Write-Result stage on next clock.   */
   /*********************************************************************/
      Using INSTR_QUE_RCRD_REG2 DO
      Format new path output to NEW_PATH_INSTRUCTION_QUEUE
   End
   If MORE_SUCESSORS_STATUS = true then
      HISTORY_SEARCH_STATUS = true
   Else
      INSTR_QUE_RCRD_REG0 =
           next instruction from WRITE_RESULT_INPUT_INSTRUCTION_QUEUE
   End Remark:
-------

Each BITMAP frame must be cleared to '0' before use. This could be done in the
Write-Result which would write zeros to the current BITMAP used. However, this
would reduce significantly the Write-Result throughput. We therefore would elect
to use a BITMAP memory with a special clear line for each port. Zeroing could
then be accomplished at LOOKAHEAD time - for each BITMAP word.
```

History buffers description:                    Date: 05/01/92

ANNEX C

There are two types of History buffers in the DPDF:
- LOOKAHEAD history buffer.
- Write_Result history buffer.

The history buffer unit which stores data associated with the k last lookahead/executed instructions, is managed as a FIFO.

1. Data structure

The buffer is an array of records. Each record contains:
   - Key address.
   - Data.

1.1 LOOKAHEAD history buffer

The key is the BITMAP address address.
The DATA is BITMAP pattern.

1.2 Write_Result history buffer

The key is the INSTR_ADDR + AR_ADDR address.
The DATA is the result.

2. History buffer operations 2.1 LOOKAHEAD history buffer operations 2.1.1 History Buffer insert
   This operation is performed by the FETCH unit.
   For each successor in the input INSTR_QUE_RCRD_INPUT do:

- ALT_PRED_BIT_MAP_ADDR = ALT_PRED_INSTR_ADDR + BITMAP_FRAME

- Calculate ALT_PRED_BIT_MAP = 0 exclude bit ALT_PRED_INDX which is 1.

- Insert the duple (ALT_PRED_BIT_MAP_ADDR, ALT_PRD_BIT_MAP) at the head of the queue. The duple at the tail of the queue is removed.

2.1.2 History Buffer search

A search is performed as in 2.1 using the key BITMAP_ADDR_INPUT.
   The search results (HISTORY_BUFFER_BITMAP_ADDRESS,
                       HISTORY_BUFFER_BITMAP_VALUE,
                       HISTORY_BUFFER_HIT_PULSE     ) are returned.

The compare operation is initiated by the LOOKAHEAD unit.

2.1.3 Ports access

The history buffer has 4 read/write ports.
The Fetch unit will have one port for write.
The 4 LOOKAHEAD units will access the 3 remaining ports using arbitration.

2.2 Write_Result history buffer operations 2.2.1 History Buffer insert

This operation is performed by the EXEC unit when writing a result.
It writes the address (INPUT_ARG_ADDR) which is the output address,
and the associated result value. No search is performed.

2.2.2 History Buffer search

This operation is initiated either by the EXEC unit or the Write-Result unit.
The key values are:
- When initiated by the EXEC unit the key = ALT_PRED_INSTR_ADDR#CHOSEN_NUMBER
- When initiated by the Write_result unit the key = ALT_PRED_INSTR_ADDR (i)

The search operation is identical to 2.1.2.

2.1.3 Ports access

The history buffer has 4 read/write ports.
The Fetch unit will have one port.

The 2 Write-Result units will access the 2 ports without arbitrations.

ANNEX D

1 DPDF Instruction set

1.1 General

This is a VHDL document which defines the DPDF instruction set. It includes:

1) Instruction format.
2) Description of addressing modes.
3) Instruction types.
4) Instruction semantics.

1.2 Instruction format

```
TYPE instr_memory_cell_rcrd_type IS RECORD
    instr_addr : instr_memory_cell_addr_type;
    operation_code : operation_code_type ;
    cnst : INTEGER/REAL ;
    -#Description: Constant value Integer or Real -
    successors_rcrd ; successors_rcrd_type;
    -#Description: Successors data structure. -
END;
SUBTYPE operation_code_type IS
    operation_code_activate_direct..operation_code_ld_var ;
SUBTYPE instr_memory_cell_addr_type IS 0..instr_memory_cell_addr_size;
SUBTYPE successors_addr_array_type IS ARRAY
    [0..successor_number_size]OF instr_memory_cell_addr_type;
TYPE successors_rcrd_type IS RECORD
    number: successor_number_size_type;
    addr: successors_addr_array_type;
    input_arg_addr : arg_addr_type ;
    -#Description: Output argument of this instruction. -
    - This is an offset in the current activation record. -
    arg_num_array : BIT(successor_number_size_type);
    -#Description: Number of inputs to activate a successor. -
    - #Value: 0 -:- 1. A 0 value means 1 input. -
    - A 1 value means 2 inputs. -
    all_pred_addr : successors_addr_array_type;
    -#Description: Every successor pointer is associated with the -
    - pointer of the alternative father node of this -
    - successor. -
    alt_pred_index_ptr : INTEGER(successor_number_size_type);
    -#Description: Every successor pointer is associated with the -
    - index of the address within the alt predecessor.-
    alt_pred_input_arg_addr : arg_addr_type(successor_number_size_type) ;
    -#Description: Every successor pointer is associated with the -
    - address of the second argument. -
    alt_pred_input_arg_addr_src : BIT(successor_number_size_type);
    -#Description: Argument source can be either relative to the -
    - current Activation Record or to the previous -
    - one pointed by the Dynamic Link. -
```

- #Value: 0 :- 1 A '1' indicates current Activation Record. -
alt_pred_input_arg_addr_port : BIT(successor_number_size_type);
- #Descriptiony: Holds the port which gets the alternate predecessor input -
- argument. -
- #Value: 0 -:- 1 ( 0 means using port 0 ). -
END;

1.3 Arguments addressing modes

All the instructions have up to one input and one output arguments which are addressed by adding the Activation Record starting address and their offsets. The input argument may be retrieved either using the current Activation Record starting address or the previous one pointed by the Dynamic Link. The output is always relative to the current Activation Record.

1.4 Arguments

Every instruction may have upto two arguments. The Instruction argument and the Home value as the second one. The Home value includes the instruction's result and the condition codes(i.e. zero, minus). Moving the result to the Instruction argument field means: a) the condition codes are lost. b) The port number associated with the result updates the port number field in the instruction queue data structure.

1.5 Instruction types

1.5.1 ALU instructions

Arithmetic instructions for INTEGER and REAL 32 bits:
- Add/Subtract/Multiply/Divide/Unary minus.

Logical instructions:
- And/Or/Xor/Not.

1.5.2 Value flow control

- Branch
- Merge
- Sink

1.5.3 Program control

- Apply (Activate).
- Terminate (Return).

1.5.4 Data memory management

- Begin
- Return (This instruction belongs also to the Program Control group.)
- Vector load or store.

1.6 Instructions' semantics

1.6.1 ALU instructions

Inputs
- Home register: One argument.
- Instruction argument: Second argument originated from the data memory.

Outputs
- Home register: ALU result.
- Home condition codes (changed by the arithmetic instructions)

Successors semantics
- Up to 4 successors.

Remarks
- None.

1.6.2 Branch instructions

There are two types of branch instructions:
- Branch on condition (i.e. BZ- Branch on zero).
- Branch after comparing two values (i.e. BG-Branch Greater).

Inputs
The inputs for the Branch on condition instructions are:
- Home register: Value and flags.
- Instruction argument: The value to be distributed.

The inputs for the Branch after comparing instructions are:
- Home register: Value to be compared.
- Instruction argument: The second value to be compared.

Outputs
- Home register: unchanged.

Successors semantics
- 2 successors for success/fail of the boolean condition.
- Only one of the 2 successors will execute.

Remarks
- Cannot be Prefetched.
- The constant field will hold the address of the second output argument where result will be sent if the TRUE condition holds.

1.6.3 Merge instruction

Inputs
- Home register: First path to arrive supplies single input.

Outputs
- The input datum is distributed as output to all successors.

Successors semantics
- Standard

Remarks
- None.

1.6.4 Sink instruction

Inputs
- Irrelevant. This instruction is needed to collect input arguments for a function before it is activated.

Outputs
- Irrelevant

Successors semantics
- Standard

Remarks
- This instruction updates the alternate predecessor bit map.

1.6.5 Apply (Activate) instruction

Inputs
- Home register: irrelevant.
- Instruction argument: Function address.
- The constant field may hold the Function Address.

Note: These two formats are mutually exclusive.

Outputs
- Address of invocation is returned as argument1.
- Home register is unchanged.

Successors semantics
- The real successor is the first instruction in the function body which is a BEGIN.

Remarks
- The Write Result unit will store the Address of Invocation on the Activation Record of the Calling program.
- The Write Result unit will update the original instruction successors bitmap.

1.6.6 Terminate (Return) instruction

This instruction executes the function exit while returning the output value. Exiting a function includes:
- Transferring control to the invocation point (last APPLY address).
- Data and BITMAP memory areas of the called function are released.
- Updating of DATA and BITMAP pointers.

Inputs
- Home register: function's result.
- Instruction argument: Caller Begin instruction address.

Outputs
- The following pointers read from the Data memory, are updated in the Instruction queue data structure:
--- Activation Record frame address.
--- Dynamic link.
--- BITMAP frame address.

Successors semantics

- This instruction does not have a successor defined in the DF graph.
However it has the successors corresponding to the return address.

Remarks
- The Prefetch and Write Result units save the address of the BEGIN instruction. All other instructions in that block reference the bitmap memory by calculating:

bitmap base address + current address - code block base address

1.6.7 Begin instruction

This is the first instruction of every function. It allocates an Activation Record.

Inputs
- Home register: Irrelevant.
- Instruction argument: Irrelevant
Note: The constant field holds two memory size requests:
- Size for the new Activation Record.
This size is determined by number of local variables and temporaries generated by the compiler.
- Size for the bitmap.
This size is equal to number of instructions in the function body.
The two sizes are limited to 64K.

Outputs
- The following pointers are updated in the Data memory:
-- Dynamic backward link.
-- Caller BITMAP frame address.
-- Called function code block base address.
-- The following pointers are updated in the instruction queue data structure:
-- Activation Record frame address.
-- Dynamic link.
-- New BITMAP frame address.
- Home register: Unchanged.

Successors semantics
- Since all the successors are ready then the first successor is chosen to be executed.

Remarks
- Prefetch mechanism is not broken for the BEGIN instruction and is suspended.
- The Prefetch and Write Result units save the address of the BEGIN instruction. All other instructions in that block reference the bitmap memory by calculating:

bitmap base address + current address - code block base address

We claim:

1. A dataflow machine for generally following data dependent path processes, the machine comprising:

an instruction store;

an operand store;

a plurality of data dependent path process executors, each process executor comprising an instruction queue and a queue loader associated with said instruction queue and operative to load said instruction queue with instructions selected from said instruction store, wherein said instructions with which said instruction queue is loaded are associated with a dynamically determined data dependent path process and are selected based, at least in part, on an active operand associated with each said instruction, said active operand comprising a result of a previous instruction, and wherein at least some of said instructions are selected based, at least in part, on availability of an outside operand, and wherein said queue loader is operative to read said outside operand from said operand store;

execution apparatus operative to sequentially apply each instruction in each said instruction queue to at least the active operand associated with each said instruction and to produce a result from each said instruction; and storing apparatus operative to store said result in said operand store.

2. A machine according to claim 1 wherein corresponding to each said instruction is a bitstring indicating whether or not any successor instructions of said instruction are enabled and wherein said queue loader includes apparatus for reading said bit-string and for selecting a next instruction on said data dependent path process in accordance with said bitstring.

3. A machine according to claim 2 and wherein said queue loader includes apparatus for selecting a new data dependent path process from a new path process queue when an old data dependent path process no longer has any enabled successor instructions.

4. A machine according to claim 1 and including apparatus for writing said result to memory for use with instructions on other data dependent path processes as said outside operand, wherein at least one of said other data dependent path processes is executing contemporaneously with the data dependent path process to which the instruction from which said result is produced belongs.

5. A machine according to claim 2 and including apparatus for writing said result to memory for use with instructions on other data dependent path processes as said outside operand, wherein at least one of said other data dependent path processes is executing contemporaneously with the data dependent path process to which the instruction from which said result is produced belongs.

6. A machine according to claim 3 and including apparatus for writing said result to memory for use with instructions on other data dependent path processes as said outside operand, wherein at least one of said other data dependent path processes is executing contemporaneously with the data dependent path process to which the instruction from which said result is produced belongs.

7. A machine according to claim 3 and including apparatus for placing at least one not selected successor instruction in said new path process queue when said bitstring indicates that more than one successor instruction is enabled.

8. A machine according to claim 1 and also comprising apparatus for temporarily capturing information associated with a small set of instructions queued for execution by said execution apparatus and queued to be written by said storing apparatus.

9. A machine according to claim 8 and wherein said apparatus for temporarily capturing comprise a lookahead history buffer for temporarily storing addresses and lookahead bitstrings corresponding to instructions whose outside operands will shortly become available and a write result history buffer for temporarily storing addresses and results corresponding to instructions which have recently been executed by said execution apparatus.

10. A machine according to claim 9 and wherein said queue loader accesses said lookahead history buffer to receive said lookahead bitstring.

11. A machine according to claim 10 wherein corresponding to each instruction of said instruction store is a stored bitstring indicating whether or not any successor instructions of said each instruction of said instruction store are enabled and wherein said queue loader includes apparatus for reading said stored bitstring, for ORing said lookahead bitstring with said stored bitstring to produce an updated bitstring and for selecting a next instruction on said data dependent path process in accordance with said updated bitstring.

12. A machine according to claim 9 wherein corresponding to each of said instructions with which said queue is loaded is a stored bitstring indicating whether or not any successor instructions of each of said instructions with which said queue is loaded are enabled and wherein said storing apparatus accesses said write result history buffer to determine if an outside operand for a successor instruction is available only if said bitstring indicates that said successor instruction is not enabled.

* * * * *